United States Patent [19]
Girard

[11] Patent Number: 5,731,821
[45] Date of Patent: *Mar. 24, 1998

[54] COMPUTER USER INTERFACE FOR STEP-DRIVEN CHARACTER ANIMATION

[76] Inventor: Michael Girard, 3324 Vernon Ter., Palo Alto, Calif. 94303

[*] Notice: The term of this patent shall not extend beyond the expiration date of Pat. No. 5,594,856.

[21] Appl. No.: 676,753

[22] Filed: Jul. 8, 1996

Related U.S. Application Data

[63] Continuation of Ser. No. 296,214, Aug. 25, 1994, Pat. No. 5,594,856.
[51] Int. Cl.$^6$ .................................................. G06T 15/70
[52] U.S. Cl. .................................................. 345/474
[58] Field of Search .......................... 395/173–175; 345/122, 473–475

[56] References Cited

PUBLICATIONS

Calvert et al., "Towards the autonomous animation of multiple human figures", Proc. of Computer Animation '94, pp. 69–75, May 25, 1994.
Life Forms User Guide, MacroMind, Inc., Jan. 1992.
Wilhelms, "Toward automatic motion control", IEEE CG&A, Apr. 1987, pp. 11–22.
Girard, "Interactive Design of 3D computer-animated legged animal motion", IEEE CG&A, Jun. 1987, pp. 39–51.
Calvert, T.W.; Chapman, J., "Aspects of the Kinematic simulation of Human Movement," IEEE CG&A, (Nov., 1982), pp. 41–50.

Primary Examiner—Joseph R. Burwell
Attorney, Agent, or Firm—Philip H. Albert; Charles J. Kulas; Townsend and Townsend and Crew LLP

[57] ABSTRACT

A character animation system executing on a computer. The system provides a simple, efficient and powerful user interface that allows the user to specify complex animations of multi-legged characters by placing footprints on a surface. The system automatically generates a natural looking animation based on the footprints. Motions such as walking, running, jumping, etc. are easily animated depending on the way footprints are placed. The user is able to create new footprint patterns and modify existing patterns. Footprint blocks on a timeline are used to specify the time duration that each foot is in contact with a footprint. The user may specify keyframes in the animation sequence that allow more complicated body movements to be incorporated with the footprint based animation.

14 Claims, 32 Drawing Sheets

COMPUTER USER INTERFACE FOR STEP-DRIVEN CHARACTER ANIMATION

This is a Continuation of application Ser. No. 08/296,214 filed Aug. 25, 1994, now U.S. Pat. No. 5,594,856.

BACKGROUND OF THE INVENTION

This invention relates generally to computer-based three dimensional modeling systems and specifically to a modeling system that allows the animation of a character based on the placement of footsteps.

Computer graphics technology has progressed to the point where computer-generated images rival video and film images in detail and realism. Using computer graphics techniques a user is able to model and render objects in order to create a detailed scene. However, the tools for animating the object are inefficient and burdensome to a user, especially when it comes to animating models of living beings such as animals or humans. Many motions such as walking, running, hopping, jumping, etc., commonly made by a bipedal character are extremely difficult to describe and input into a computer system for purposes of making the three-dimensional model of the character move in a smooth and lifelike way.

One technique to realistically animate a computer model of a human character is to use data capture with live actors. Points on a human actor's body are monitored and are translated into points in a computer three-dimensional coordinate system. While the actor's movements are translated into realistic movements in a computer animation, this technique is costly, is limited to the physical performance of the actor and has restrictions on the types of movements that can be captured.

Other techniques are more closely related to standard computer aided design and computer modeling approaches. One such approach is to use keyframes that each specify an orientation of the character in one frame of an animation sequence. A first keyframe could show the character standing still while a second keyframe shows the character's right leg partially raised and moved forward from the body. The two keyframes are spaced apart by a selected amount and the computer system interpolates the "in-between" frames to provide smooth animation.

While keyframes reduce a user's or animator's work in animating a living character, such as a human, the user is required to deal with mathematical and spatial concepts of motion mechanics, animation timing, etc. The problem is that the user must place major body parts such as the knee, foot, or torso in accurate locations with respect to each other and with respect to their locations in a previous keyframe. This means that the user needs to have a knowledge of body kinematics and must be able to envision the moving character in time and space and translate the character's movements into a series of positions at specific instances in time. The problem is compounded by the fact that keyframe animation techniques typically employ interpolation functions that merely provide for the continuity of position and speed of the body parts (spline interpolation) without taking into account the mechanics of movement of the entire body. The result of such a simple keyframe approach is that the character's movements are often not life-like or natural in the animation.

Keyframe computer animation was pioneered at the University of Utah by Ivan Sutherland and his students in the early 1970's. Many extensions to keyframe animation techniques have been published that focus on the design and properties of piecewise continuous interpolating splines. See, for example, Kochanek D., and Bartels, R., "Interpolating Splines with Local Tension, Continuity, and Bias Control," SIGGRAPH proceedings, 1984; and Steketee S., Badler N., "Parametric Keyframe Interpolation Incorporating Kinetic Adjustment and Phrasing Control," SIGGRAPH proceedings, 1985.

Until only recent years, the computer animation of articulated figures, such as legged animals and human forms, was carried out using general-purpose key-frame computer animation systems. These systems could be used to animate articulated limbs by interpolating joint angles. Computing the limb's cartesian-space position from its joint angles is called "forward kinematics."

However, a major shortcoming of these systems is that joint interpolation may not be used to move the end of the limb along a specific path. Goal-directed movements, such as moving the hand to open a door, or planting a foot at a specific place on the ground, require the computation of inverse-kinematics—solving for the set of joint angles which place the end of the limb at a desired location and orientation. See Whitney, D. E., "Resolved Motion Rate Control of Manipulators and Human Prostheses," IEEE Transactions on Man-Machine Systems, MMS-10(2) pp. 47–53, June, 1969. Research in the robotics community on inverse-kinematic control has been successfully applied to computer animation. See Korein, J. U., and Badler, N. I., "Techniques for Generating the Goal-Directed Motion of Articulated Structures," IEEE Computer Graphics and Applications, November 1982, pp. 71–81; Girard, M., and Maciejewski, A., "Computational Modeling for the Computer Animation of Legged Figures," ACM Computer Graphics, SIGGRAPH proceedings, 1985; and Girard, M., "Interactive Design of 3D Computer-Animated Legged Animal Motion," IEEE Computer Graphics and Applications, June 1987.

Attempts have been made to employ higher-level movement notations borrowed from dance, such as Labanotation, see T. W. Calvert, J. Chapman, A. Patla, "Aspects of the Kinematic Simulation of Human Movement," IEEE Computer Graphics and Applications, Nov. 1982. These systems "compile" labanotation into a sequence of body postures that are designated in terms of joint angles. The body postures are interpolated, using forward kinematics, into a human motion. However, with systems using this approach it is impossible to automate the motion of a figure in a simple manner, such as by specifying a path through space.

A recent trend in articulated animation research has been directed toward incorporating the simulation of "dynamics:" computing the relation between joint forces and joint accelerations. As with kinematic problems, robotics research on the dynamics of articulated limbs has led to efficient general purpose methods. See Featherstone, Robot Dynamics Algorithms, Kluwer Academic Publishers, Boston, Mass. 1988. Some of these methods have been employed in computer animation systems. See Armstrong, W. W., Green, M. and Lake, R., "Near-Real-Time Control of Human Figure Models," Graphics Interface, 1986; and Wilhelms, Jane Patricia, "Graphical Simulation of the Motion of Articulated Bodies Such as Humans and Robots, with Particular Emphasis on the Use of Dynamic Analysis," Ph.d Dissertation, University of California, Berkeley, 1985.

However, the mechanics of movement may not be derived solely from dynamic simulation unless the articulated animal is a passive string of linked bodies, such as a marionette. The forces necessary for coordinated animal movements, such as reaching and walking, must somehow be determined. Due to the nonlinear relationship between joint forces and limb movement, and the need to satisfy constraints on a movement's path, speed, and energy expenditure, modeling coordinated motion is fundamentally a problem of control. See, Raibert, Marc, Hodgins J., "Animation of Dynamic Legged Locomotion," ACM Computer Graphics, SIGGRAPH proceedings, 1991.

To date, the most advanced computer animation products for animating articulated animals employ forward and inverse kinematics as a means of animating individual limbs but lack any higher-level modeling of motions of the animal as a whole. The "Actor" module of the "Creative Environment" from SoftImage, Inc. and the "Kinemation" module from Wavefront Technologies, Inc. represent the state-of-the-art of currently available commercial systems.

In these systems, the animator must control the character as a collection of connected kinematic chains. Constraints that plant the feet and hold them in place using inverse kinematics may be dynamically orchestrated to, for example, make a human-like character run forward. But the dynamics of the motion of the body under the influence of gravity and its balance over the center-of-mass must be achieved "by hand," with no support from the program.

Similarly, a system that is targeted at choreographers, called "LifeForms," from Kinetic Effects, Inc., provides only standard forward and inverse-kinematic techniques, with the exception of a special purpose walking module that provides some high-level control over walking in a straight line, see Bruderlin, A.; Calvert, T., "Goal-Directed Dynamic Animation of Human Walking," ACM Computer Graphics Vol. 23, No. 3, July 1989. While these products provide some assistance to a user in animating a character they fail to free the user from much of the burden of determining body positions in order to create natural looking animations. Also, the user interfaces for these products do not provide simple and efficient ways to create lengthy and complex animations of lifelike characters.

SUMMARY OF THE INVENTION

The present invention allows a user of a computer animation system to animate multi-legged characters in very simple and intuitive ways. The user specifies the timing and placement of footsteps on a surface and the animation system determines the actions of the rest of the character's body in order to effect simple actions such as walking, running, jumping, etc. More complex motions are easily specified by using a combination of footstep placement and keyframe specification to generate, for example, dancing movements, or additional movements during the simple actions—such as waving while walking.

One embodiment of the invention uses a method for editing the movements of simulated characters in a computer system. The computer system includes a display screen, processor, memory and user input device, the method includes the steps of: using the processor to display a view of a surface on the display screen; accepting signals from the user input device to define one or more footprints at different locations on the displayed surface; and using the processor to animate the character so that one or more of the character's feet are moved from footprint to footprint during the animation.

The principal innovations of the invention are twofold. The first is the notion of a "footstep motion compiler." The invention takes a high-level specification of the location, duration and timing of each foot of the character and "compiles" it into a set of keyframe sequences for each body part that produces a movement along the footsteps. Of course, there is no single movement belonging to a given sequence of footsteps. There are many keyframe sequences that could satisfy the timing and placement requirements of any given footstep specification. Therefore the compiler acts to synthesize the simplest case, thus leaving the animator to embellish the default movement with expressive idiosyncrasies by adjusting, inserting and deleting the automated keyframes.

A second critical innovation of the invention is the use of "physically-based animal interpolation." Under this approach, the program interpolates keyframes in accordance with Newtonian mechanics and a knowledge about the specialized nature of legged animal movement, rather than the more general, but ineffective spline interpolation utilized by present keyframe animation systems.

BRIEF DESCRIPTION OF THE DRAWINGS

FIG. 24 is a continuation of the movement shown in FIG. 23;

FIG. 25 is a view as the character's left foot touches a designated footprint;

DESCRIPTION OF THE PREFERRED EMBODIMENT

Figure 1:
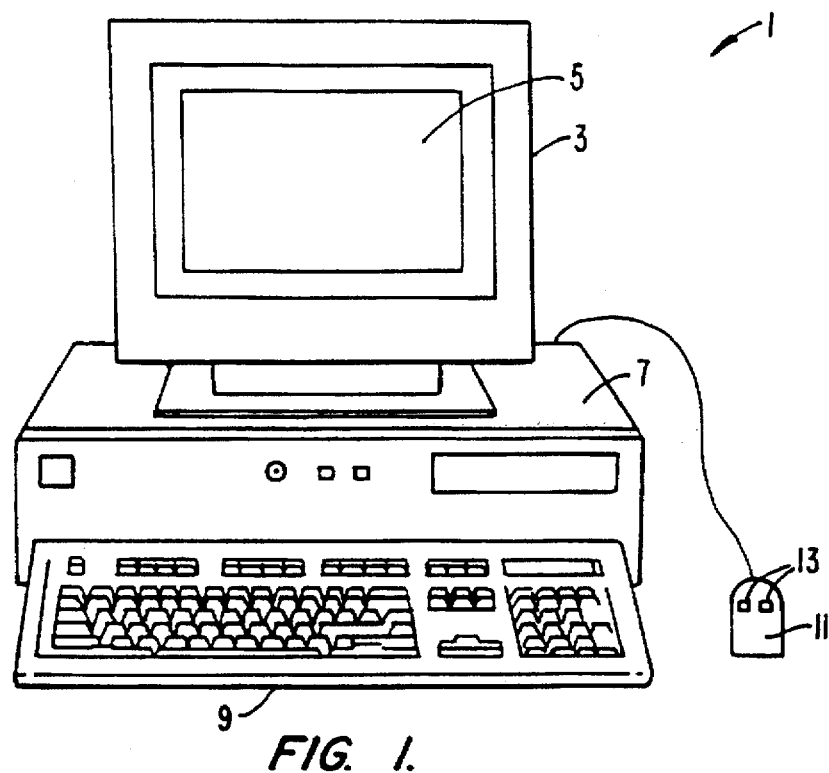
FIG. 1 is an illustration of a computer system suitable for use with the present invention.

FIG. 1 is an illustration of a computer system suitable for use with the present invention. FIG. 1 depicts but one example of many possible computer types or configurations capable of being used with the present invention. FIG. 1 shows computer system 1 including display device 3, display screen 5, cabinet 7, keyboard 9 and mouse 11. Mouse 11 and keyboard 9 are "user input devices." Other examples of user input devices are a touch screen, light pen, track ball, data glove, etc.

Mouse 11 may have one or more buttons such as buttons 13 shown in FIG. 1. Cabinet 7 houses familiar computer components such as disk drives, a processor, storage means, etc. As used in this specification "storage means" includes any storage device used in connection with a computer system such as disk drives, magnetic tape, solid state memory, bubble memory, etc. Cabinet 7 may include additional hardware such as input/output (I/O) interface cards for connecting computer system 1 to external devices such as an optical character reader, external storage devices, other computers or additional devices.

Figure 2:
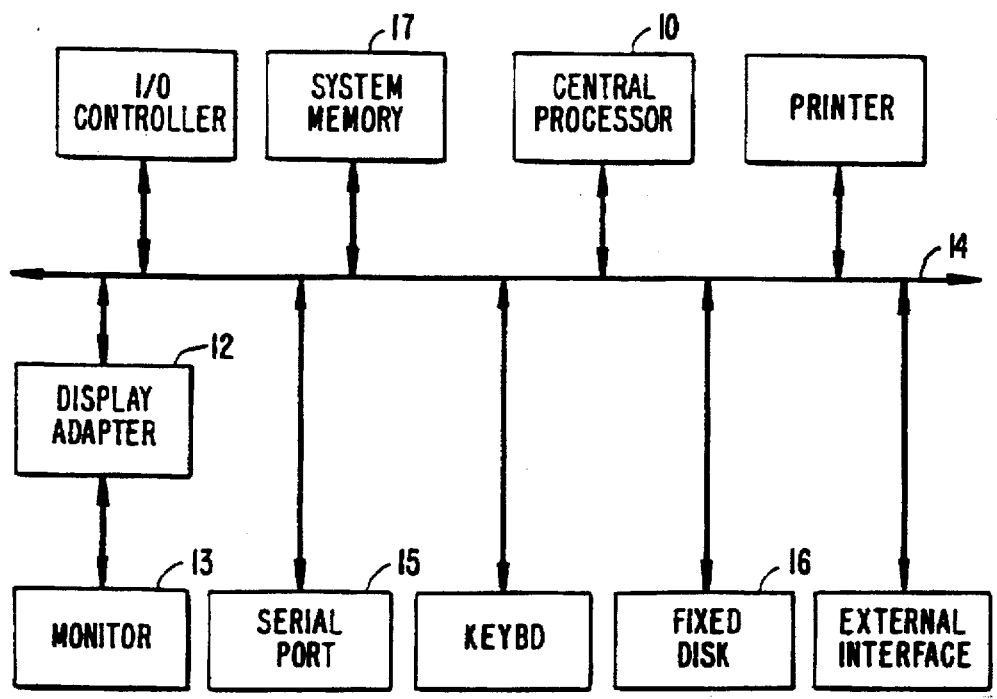
FIG. 2 is an illustration of basic subsystems in the computer system of FIG. 1.

FIG. 2 is an illustration of basic subsystems in computer system 1 of FIG. 1. In FIG. 2, subsystems are represented by blocks such as central processor 10, system memory 17, display adapter 12, monitor 13 etc. The subsystems are interconnected via a system bus 14. Additional subsystems such as a printer, keyboard, fixed disk and others are shown. Peripherals and input/output (I/O) devices can be connected to the computer system by, for example serial port 15. For example, serial port 15 can be used to connect the computer system to a modem or mouse input device. The interconnection via system bus 14 allows central processor 10 to communicate with each subsystem and to control the execution of instructions from system memory 17 or fixed disk 16, and the exchange of information between subsystems. Other arrangements of subsystems and interconnections are possible.

Figure 33:
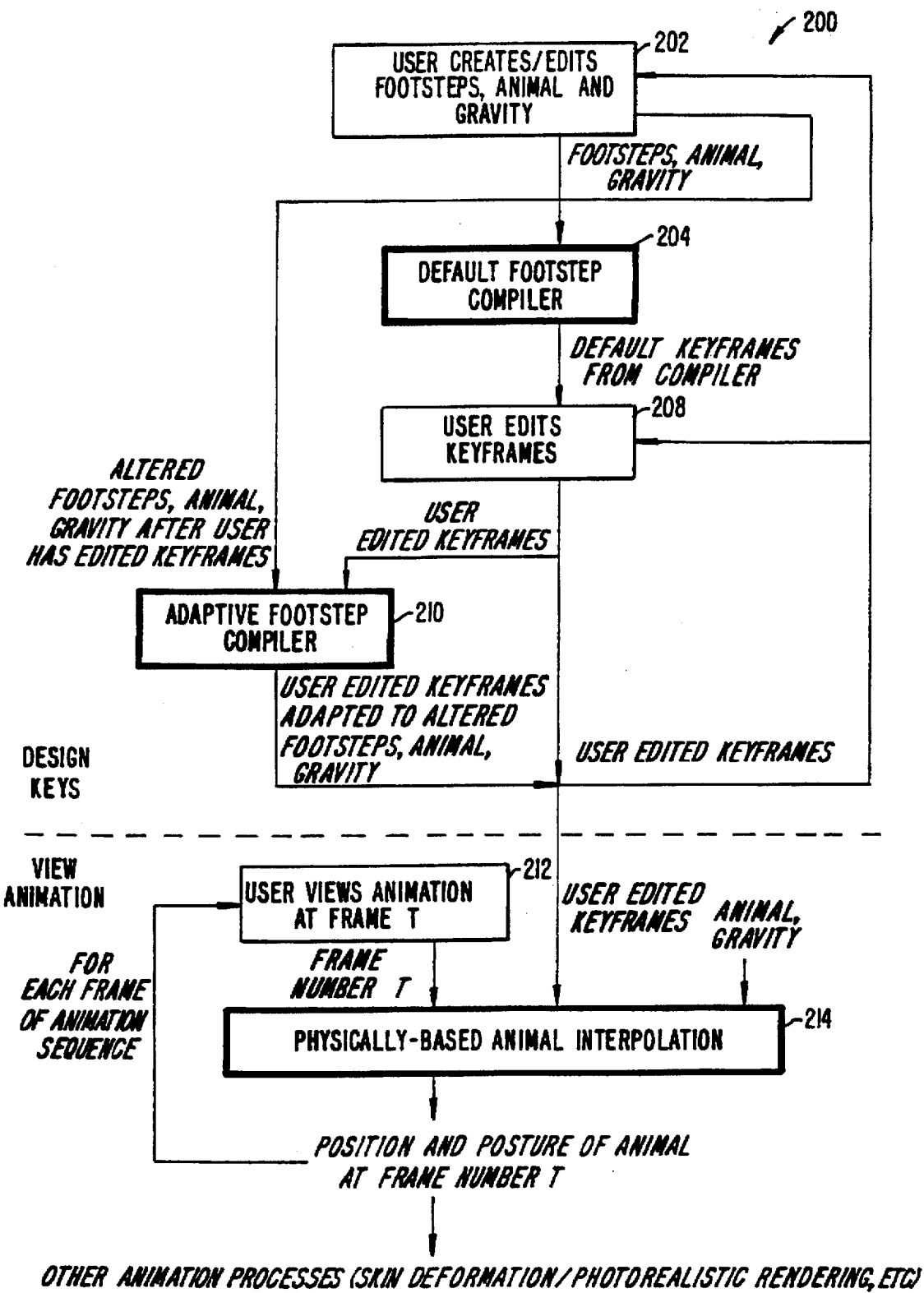

The design process of the invention is shown in the diagram of FIG. 33. The animator begins by designing a footstep pattern consisting of a sequence of locations and a timeline designating the support periods for each step, one for each foot. Once this is done, the Default Footstep Compiler "compiles" the higher-level footstep specification into a lower-level set of default keyframes that will animate the character over the footsteps in a standard fashion. Then, in order to create idiosyncrasies in the motion of the character, the initial default keys may be edited through insert/replace/delete operations. Once this has been done, the animator may wish to make some change to the original footstep pattern. In order to avoid losing the work done so far, the animator may invoke the Adaptive Footstep Compiler which assures that the edited keyframes are changed as little as possible in order to match the altered footstep specification.

Animation follows directly from the keyframes. Unlike many simulation-based systems, the physically-based interpolation function, Physically-Based Animal Interpolation, may determine the posture of the animal at any frame directly from the keyframe information, given the magnitude of gravity and the distribution of mass of the character. Once some keyframes have been generated (beginning with the default keys), the animal (or animals) may be animated or viewed at a specific frame or sequence of frames.

The design may be summarized as shown below in Table I:

1. User creates/reads/edits the skeleton of the character to animate
2. User creates/reads/edits footsteps: footstep locations and timing graph (henceforth called a footstep timeline) for left and right foot placements
3. User may attach characters to their associated footsteps
4. Program compiles footsteps into default keyframes using the Default Footstep Compiler function
5. Animator edits default keyframe positions using general replace, insert, delete, append operations to produce user edited keyframes
6. Animator may then edit the footsteps, animal dimensions, or gravity and then adapt the edited keyframe positions to match these global alterations using the Adaptive Footstep Compiler function
7. A Character may be animated or viewed at a specific frame (or frames) by calling the Physically-Based Animal Interpolate function.
8. Repeat steps 5, 6, 7 in any order until the animation is satisfactory.

Table I

Next, the user interface of the present invention is discussed in detail.

Figure 3:
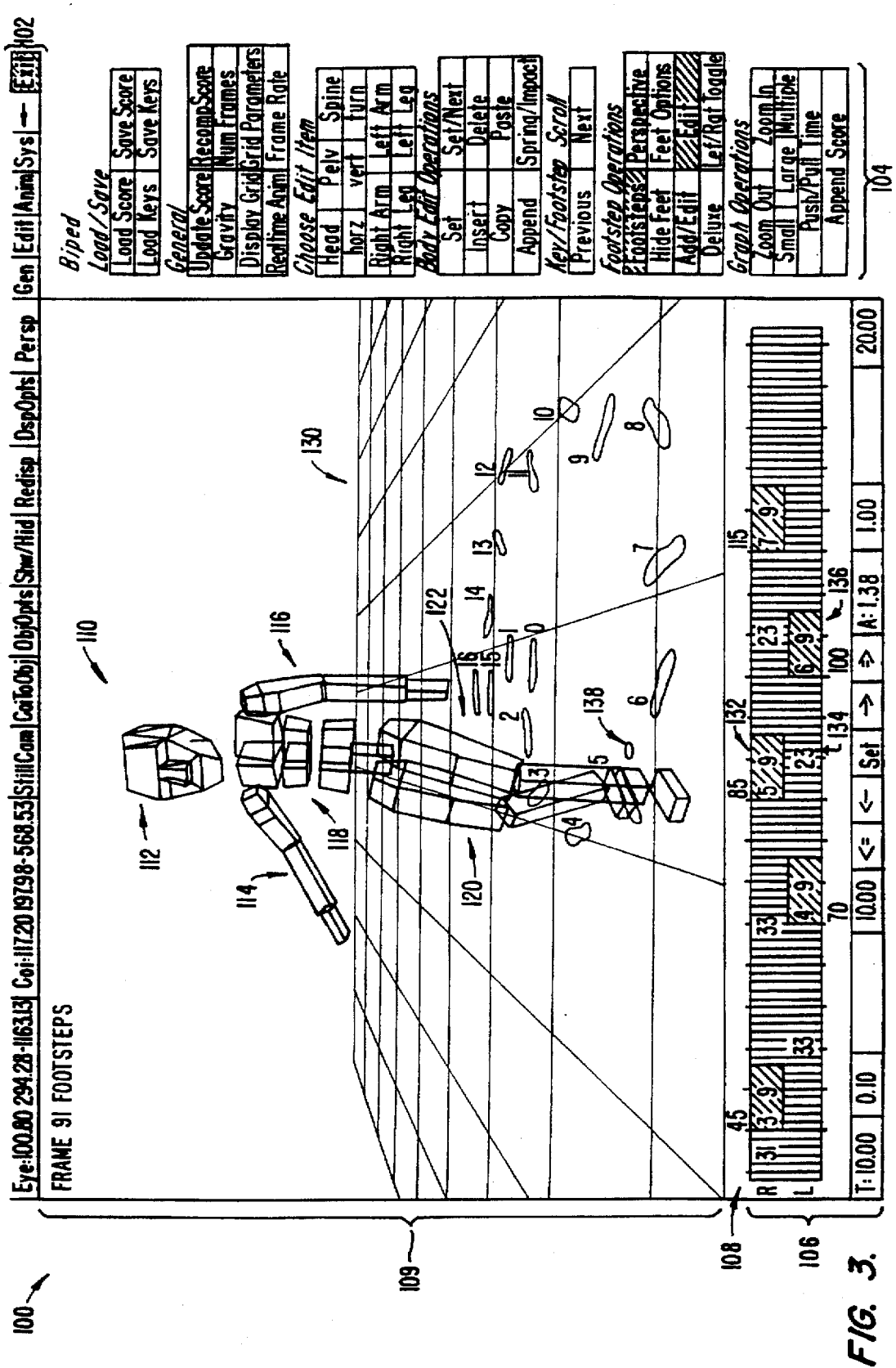
FIG. 3 is a screen display of a computer system according to the present invention.

FIG. 3 shows a screen display of a computer system using the present invention. Screen display 100 is designed to show an overview of various aspects of the user interface of the character animation program. In screen display 100, a main menu bar with various options is shown along the top of the screen at 102. Other commands or options are shown to the right of screen display 100 at 104, organized into various categories as Load/Save, General, Choose Edit Item, Body Edit Operations, Key/Footstep Scroll, Footstep Operations and Graph Operations.

More controls and information relating to a timeline are shown at 106. Timeline 108 gives information on right and left footsteps such as the amount of time each foot of the character is in contact with the particular footstep.

In timeline 108, the duration that a foot is in contact with a given footstep is shown by the length of each footprint block, shown as shaded squares along the timeline. In a preferred embodiment, the timeline is marked in terms of frames. In a given animation, the frame rate will typically be constant at a rate such as 30 or 24 frames per second (fps). Each vertical line or demarkation in timeline 108 marks the beginning of the display of a new frame proceeding left to right along the timeline. Each frame is displayed until a subsequent frame replaces it. Numbers on the outside top and bottom edges of the timeline bar are absolute frame numbers and they show a continually increasing numbering of ordered frames starting from 0 and proceeding from left to right. In FIG. 3, screen display 100 only shows a portion of the total timeline so that the leftmost frame in timeline 108 is frame 39. The user is able to view different portions of the timeline as needed. As explained below, the user is also able to view and edit different portions of the timeline.

In FIG. 3, screen display 100 has a major portion devoted to a viewing window 109. Within viewing window 109 are surface 130, character 110 and footsteps numbered 0 through 16. Also shown in screen display 100 of FIG. 3 is a wire frame rendition of a simple, bipedal human character at 110. Major parts of the character are shown, such as head 112, arms 114 and 116, spine 118, and legs 120 and 122. In the accompanying Figs. the character is shown rendered in wireframe mode. The character may be more or less fully rendered depending on the speed of the computer system and the detail desired. In a preferred embodiment the character may be displayed or rendered as a stick figure, wireframe or solid figure.

Footsteps are shown on surface 130 and are each given a reference number as footsteps 0 through 16. While the surface is shown as uniformly flat, it is possible to use a variety of surfaces with the animation system of the present invention. For example, it will be readily apparent that a sloped surface, steps, or other irregular surface may be used.

In FIG. 3, the right foot of character 110 is currently placed on footstep 5. Footstep 5 corresponds to footstep block 132 shown on timeline 108. Current frame marker 134 shown below the bottom edge of timeline 108 points to the currently displayed frame. Note that the current frame mark is within footstep block 132 which corresponds to footstep 5. This can be seen by the reference number 5 in the upper, lefthand corner of footstep block 132. Character 110's left foot is in motion and is going to be placed on footstep 6 at some time in the future. To be precise, character 110's left foot will be placed on footstep 6 at frame 100 since footstep block 136 corresponds to footprint 6 and begins at frame 100.

A center of gravity mark (COG) is shown projected onto surface 130 as COG mark 138.

Figure 4:
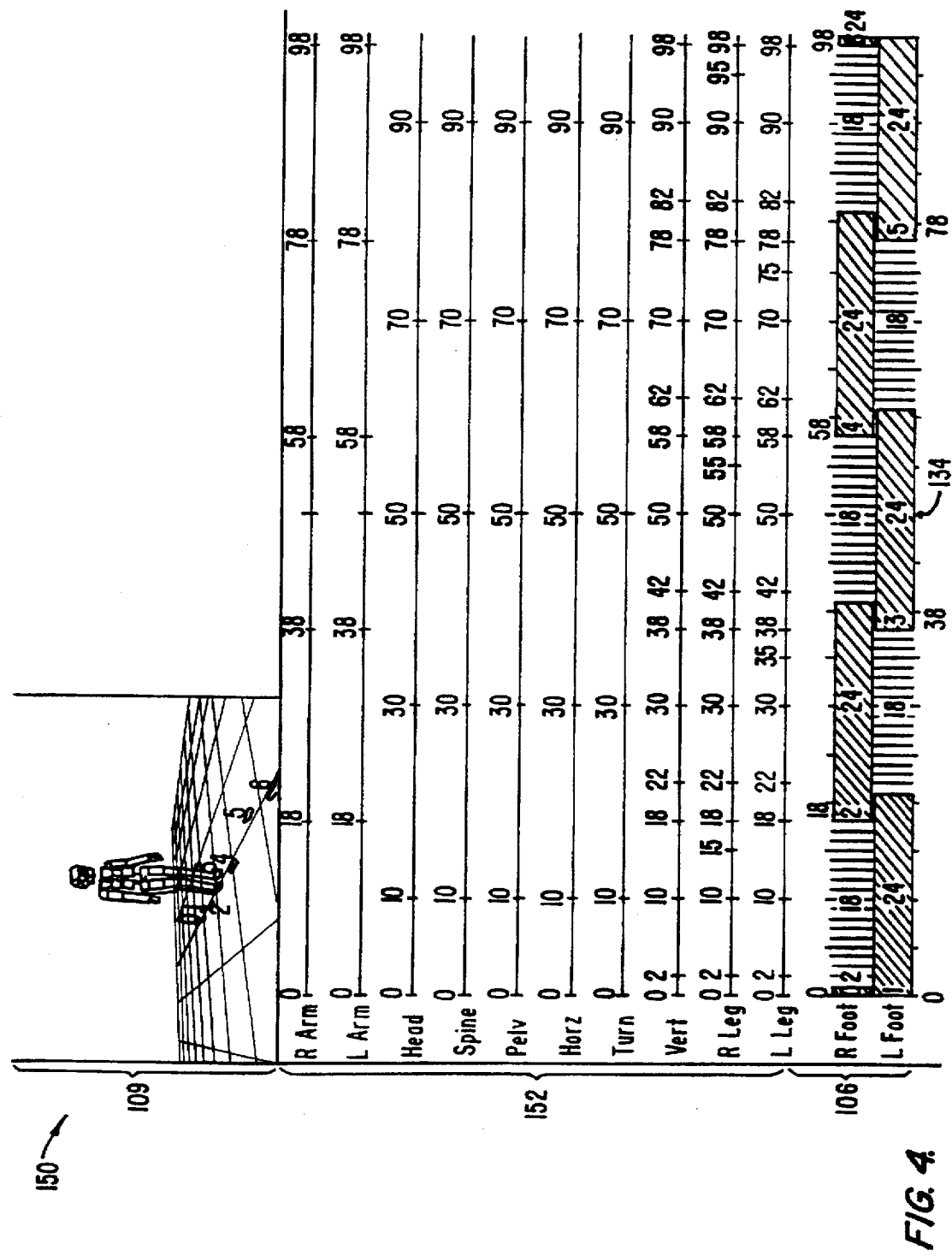
FIG. 4 is a screen display according to the present invention showing a reduced frame and multiple keyframe tracks.

FIG. 4 shows screen display 150 with a reduced viewing window 109. In general, identically numbered objects between figures are used to indicate the same object with the exception being the footstep and footstep block reference numbers. Also shown in screen display 150 is timeline area 106. Viewing window 109 has been reduced so that keyframe tracks at 152 may be displayed. Also, the controls and other information are not displayed in order to provide more area for information such as the keyframe tracks.

In screen display 150 of FIG. 4, ten keyframe tracks are shown. Each track is associated with a different part of the character. The topmost keyframe track corresponds to the right arm, the next track down to the left arm, the next one to the head, and so on. For the right arm keyframe track, a mark is made at frame 0. Note that the keyframe tracks line up with the frame marks of the timeline at the bottom of the screen. For each keyframe track, a keyframe is indicated where the body part associated with the keyframe track has been specified by the user to be in a certain position.

For the right arm keyframe track, the right arm has been specified to be in a certain position at frames 18, 38, 58, 78 and 98. Similarly, the left arm has the same timing of keyframes. A keyframe exists at frame 0 by default since a starting position is needed for the figure.

Between specified keyframes, interpolation is performed by the computer using a combination of kinematics and dynamics equations to correctly emulate natural movements. The specification and use of keyframes is discussed in more detail below.

The bold mark at the center of the keyframe tracks is used as a marker for the current frame and is in line with current frame marker 134.

Selecting A Current Footstep

Figure 5:
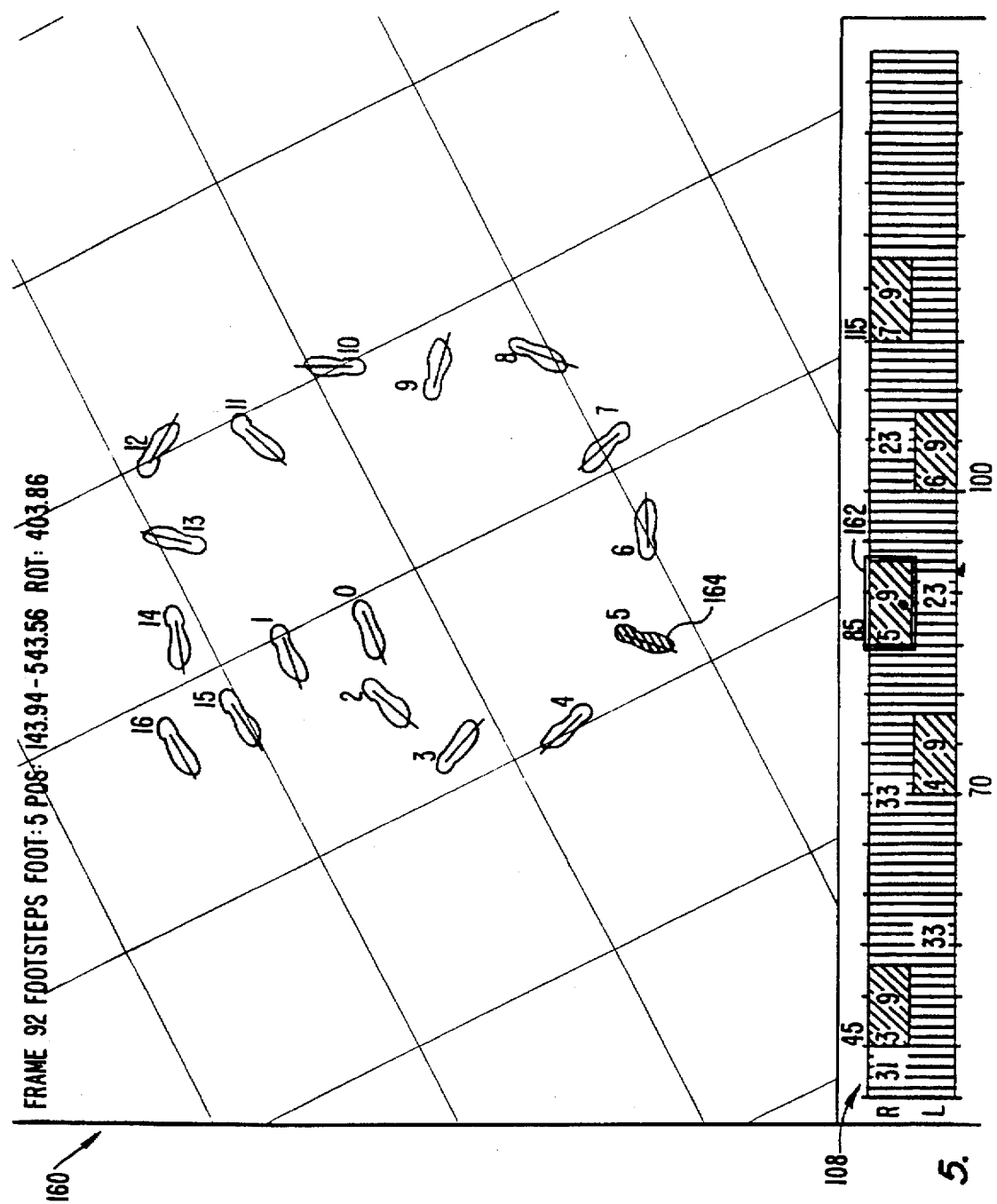
FIG. 5 is a screen display of an overhead view of a footstep surface showing a layout of sequential footsteps.

In FIG. 5, screen display 160 shows an overhead view of footprints on the surface grid in the display window. The footprints correspond to footprint blocks on the timeline at the bottom of a portion of display screen 160.

In FIG. 5, the display window shows footprints with reference numbers 0 through 16. In a preferred embodiment, the footprint symbol is the approximate shape of the sole of a shoe so that left and right footprints may be differentiated and so that the orientation of the character's foot is indicated by the footprint shape itself. As an aid to viewing and manipulating the footprint orientation, a line is drawn through the middle of each footprint and extending past the toe of the footprint.

As discussed above, footprint blocks such as footprint block 162 correspond with footprints 0 through 16 in the display window. Each footprint block has a footprint reference number in its upper left-hand corner. Footprint block 162 thus corresponds to, or is associated with, footprint 5 in the display window. Note that footprint blocks toward the top half of timeline 108 in FIG. 5 correspond to the placement of the character's right foot while blocks toward the bottom half of timeline correspond to the placement of the character's left foot. This is in accordance with footprint 5's drawing, which is that of a right footprint as footprint block 162 is at the top half, or right footprint block area, of timeline 108.

Pointer 164 is shown in the display window of FIG. 5's display screen. Pointer 164 is sufficiently close to footprint 5 so that footprint 5 is selected as the current footprint. In a preferred embodiment, the current footprint is selected by moving pointer 164 so that it overlaps, or is sufficiently close to, a specific footprint. Alternatively, the user can move pointer 164 over a footprint block such as footprint block 162 in order to select the footprint associated with the block as the current footprint.

The system indicates the current footprint by coloring in the selected current footprint so that it is easily distinguishable from other footprints. In FIG. 5 this coloring is shown merely as a darkened shading. A box is displayed around the footprint block for the current footprint, assuming the footprint block is in the portion of the timeline being displayed. This box has been exaggerated for ease of illustration and is shown around footprint block 162 of FIG. 5. Other methods for indicating current footprints are possible such as by highlighting a footprint and/or the footprint block.

Figure 6:
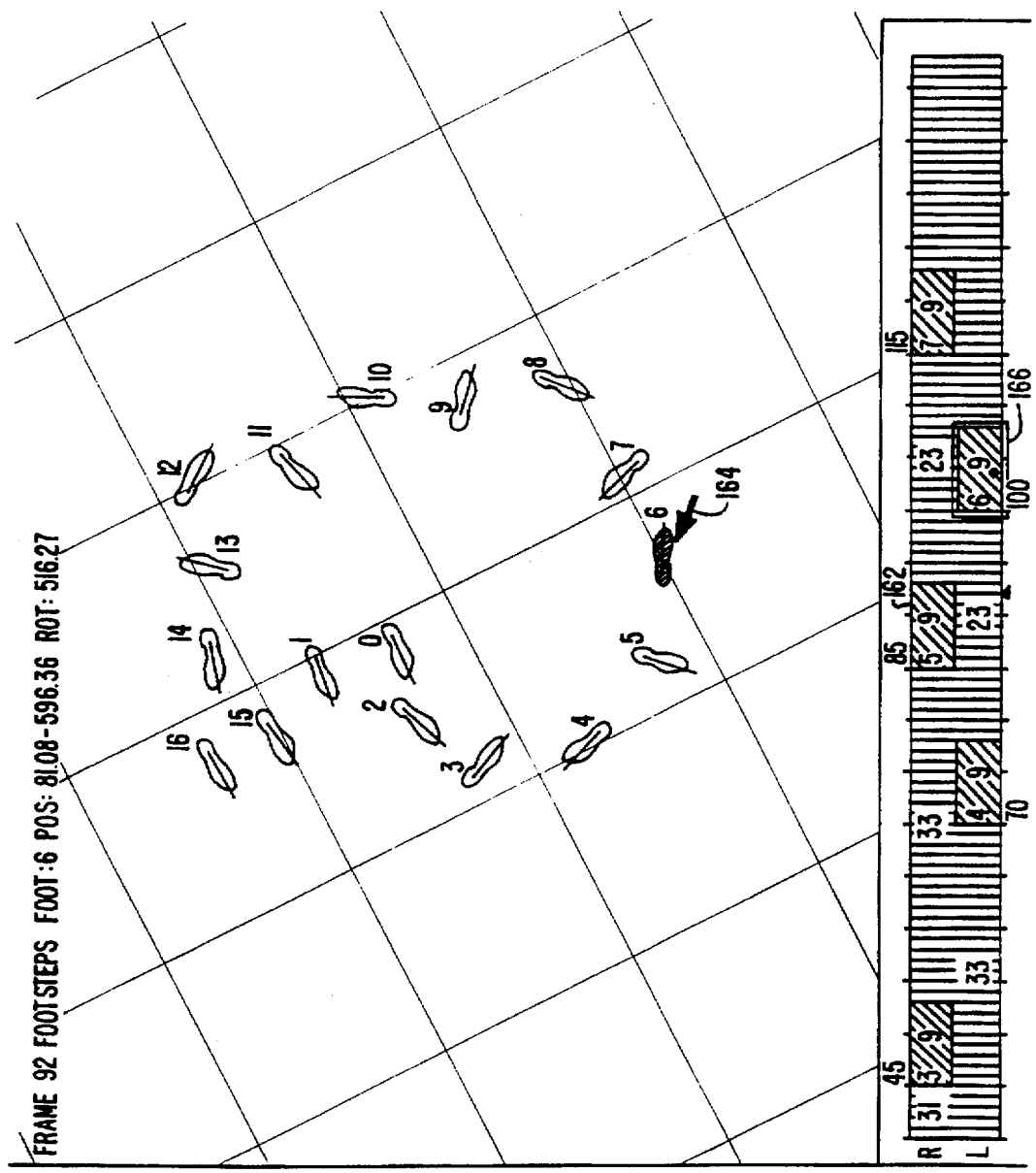
FIG. 6 is a screen display similar to that of FIG. 5, with a different footprint selected as the current footprint.

FIG. 6 is similar to FIG. 5 in that it shows a screen display window and a timeline. The footprints and footprint blocks on the timeline are the same as those in FIG. 5 except that pointer 164 has been moved so that it is sufficiently near footprint 6 to cause the system to designate footprint 6 as the current footprint. Footprint block 166, which corresponds to footprint 6, is now shown with a box around it while the box around footprint block 162 has been removed. Again, selection of footprint 6 as the current footprint can be achieved by positioning cursor 164 over footprint 6's associated footprint block, namely, footprint block 166.

Animation Using Footprints

Next, FIGS. 7–10 are discussed to illustrate an animation sequence showing a character walking in accordance with the placement of footprints on a surface.

Figure 7:
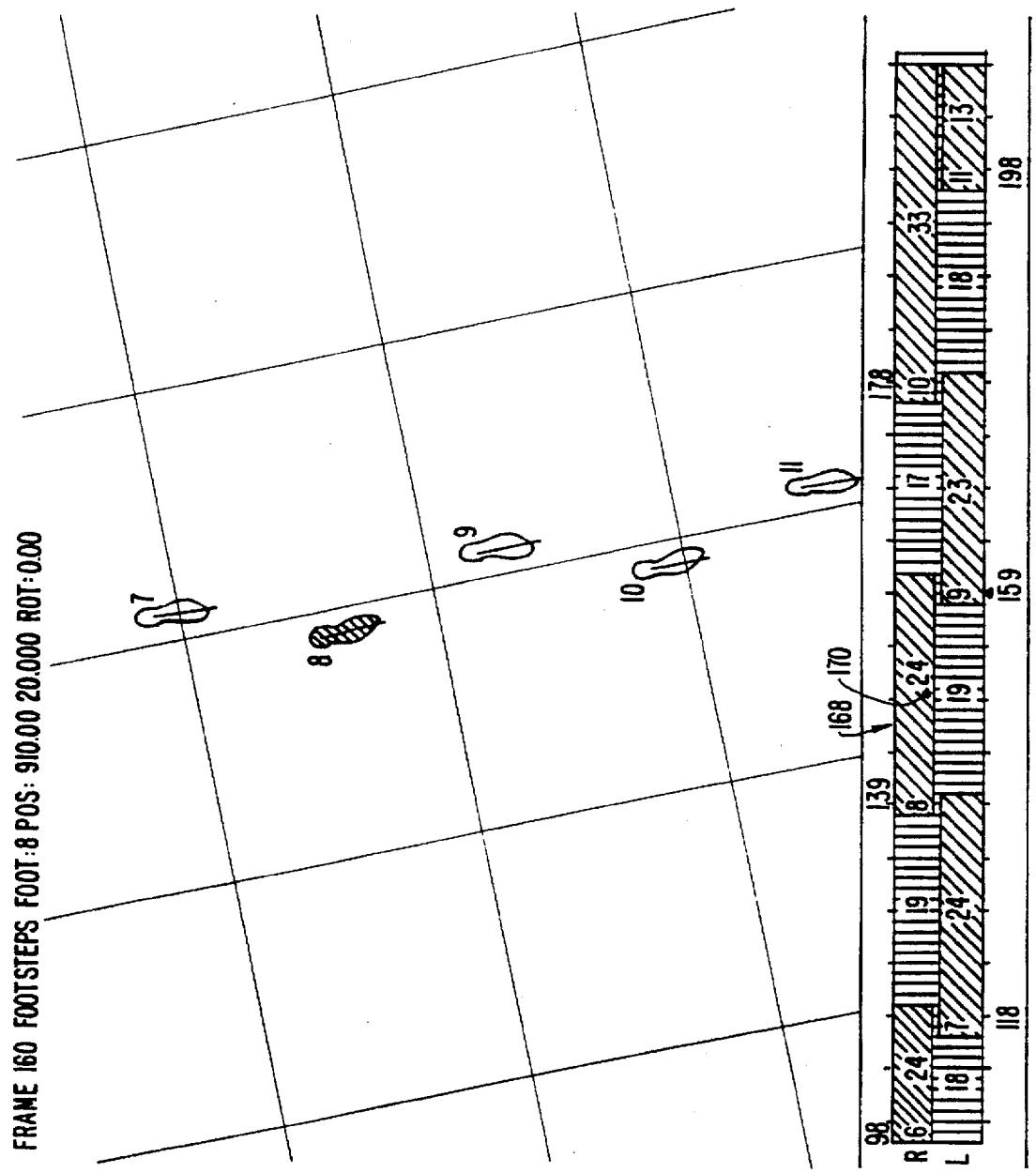
FIG. 7 is a screen display of an overhead view of the footprint surface along with a time line of footprint blocks used together to define a walking sequence.

FIG. 7 shows a screen display including an overhead view of footprints and a timeline of footprint blocks that define an animation sequence for a walking two-legged character. In the footprint blocks, the numbers in the center of each block show the duration that the character's respective foot is in contact with the associated footprint. For example, the character's right foot is in contact with footprint 8 for a total of 24 frames since footprint block 168 corresponding to footprint 8 covers 24 vertical demarcations on the timeline.

Similarly, the character's left foot will be in contact with footprint 9 for a total of 23 frames. Where there is an overlap between right and left footprint blocks, such as at frames 158–161, this indicates that both of the character's feet are in contact with the surface for a short period of time as is typical of a walking movement.

Footprint blocks may be repositioned by clicking on a drag point within a selected footprint block and dragging the block. For example, point 170 of FIG. 7 shows a selected footprint block drag point. In the preferred embodiment, drag point 170 is only visible when footprint block 168 is selected.

Figure 8:
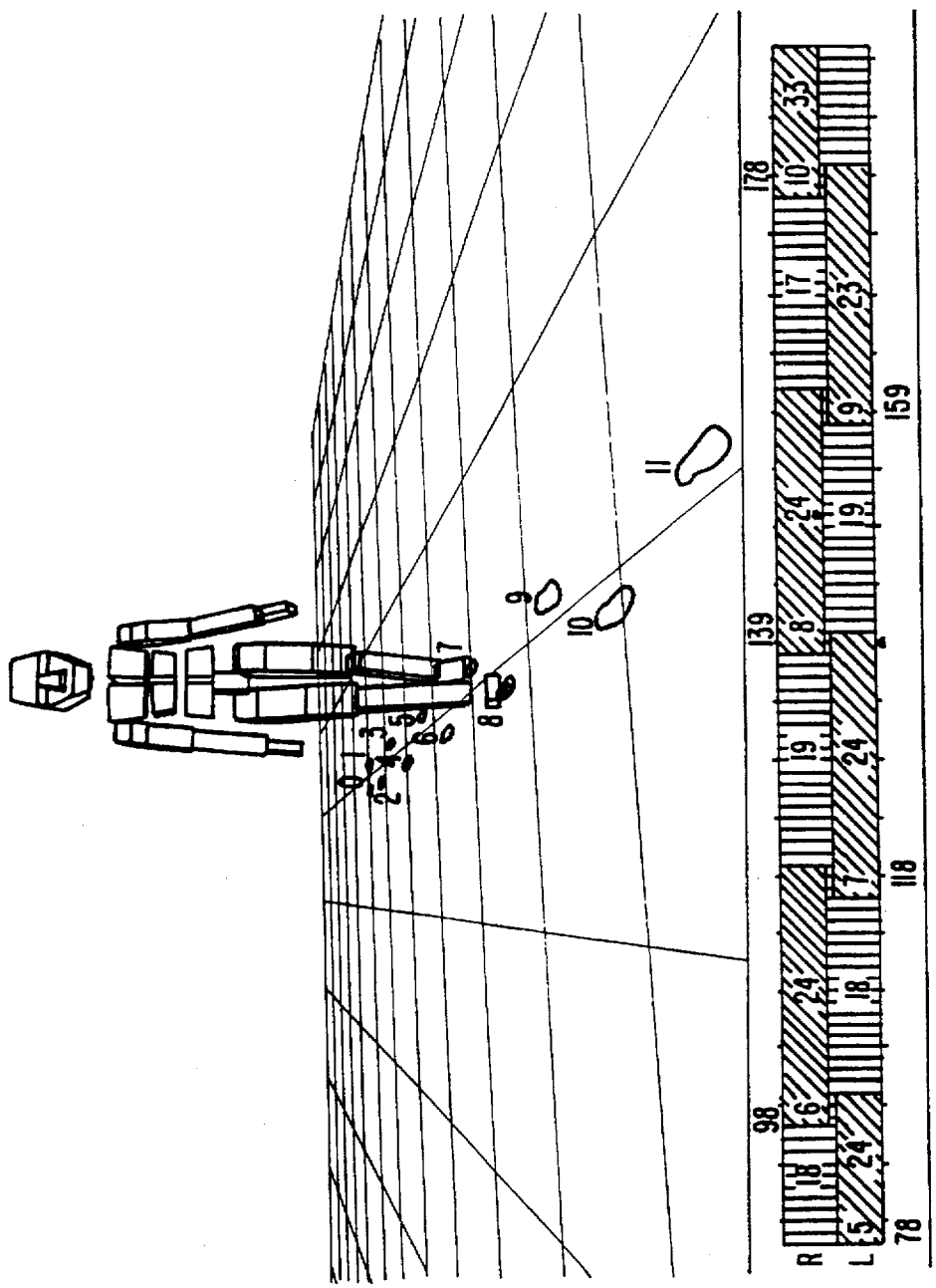
FIG. 8 is a screen shot os a perspective view of a wire frame character following the footsteps shown on a footstep surface.

FIG. 8 shows a perspective view of the wireframe character as it appears in frame 139 of the animation sequence. Note that, in FIG. 8, footprint block 8 begins at frame 138, or one frame before the current frame, so that the character's right foot has been placed onto footprint 8 for only about 1/30th of a second. This is in accordance with the wireframe illustration of the character's right foot which is shown with the heel just touching footprint 8. Also, regarding footprint 7 and footprint block 7, the character's left foot has been in contact with footprint 7 for 22 frames or 22/30ths of a second, so that it is nearing the end of its contact with the footprint, hence the toe of the character's left foot is shown just contacting footprint 7 as the character's left foot is about to be removed from footprint 7.

Figure 9:
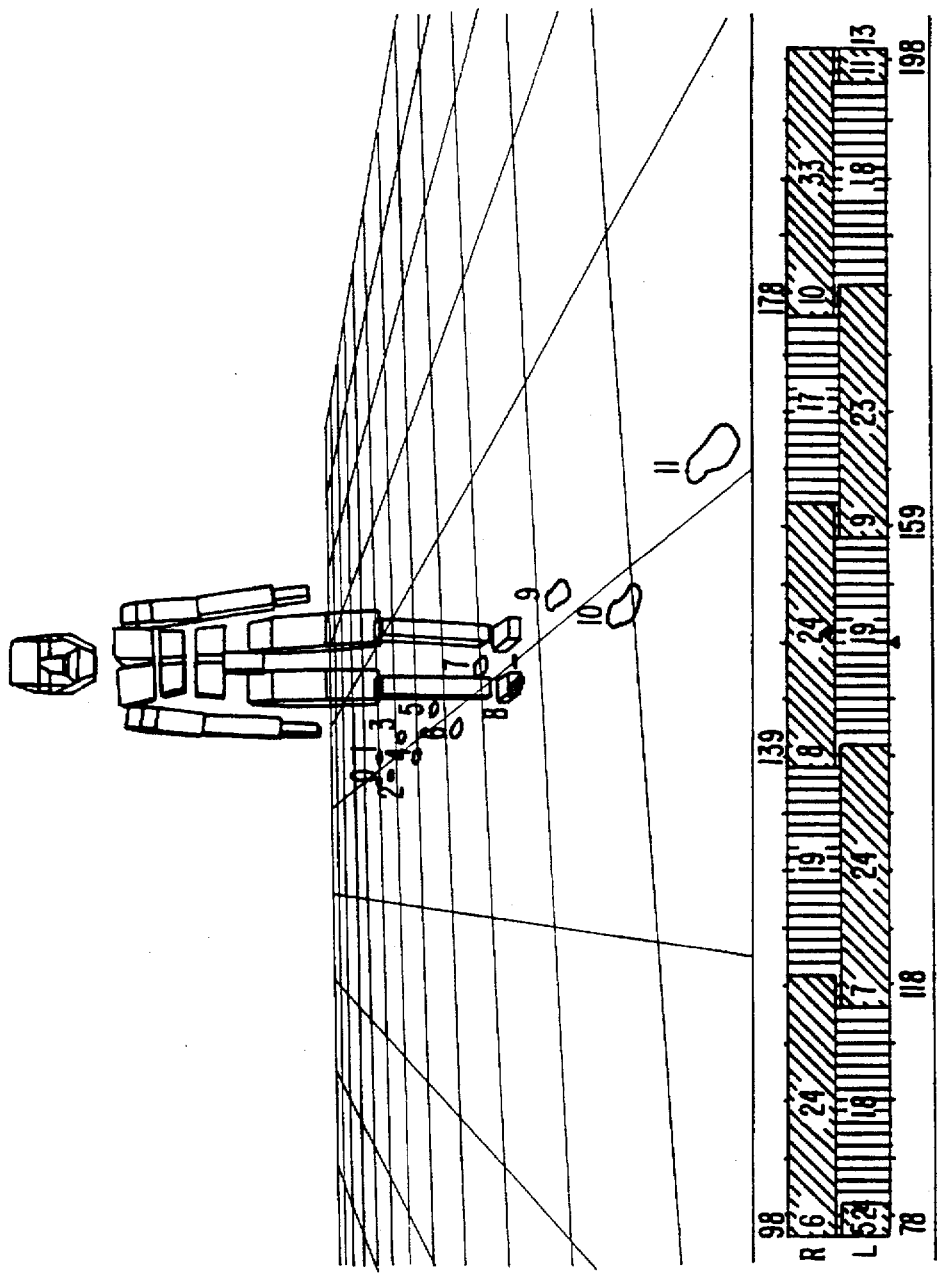
FIG. 9, taken together with FIG. 8 show the progression of the character along the footprint surface.

In FIG. 9, the character's walking motion is further under way as the animation has progressed to frame 149. At this point in the animation, the character is halfway through footprint block 8 for its right foot position and has not encountered a footprint block for its left foot position. Thus, the character's feet positions are shown in FIG. 9 having its weight, or center of gravity, roughly centered over its right foot while the left foot is midway between footprint 7 and 9 on its way to being placed onto footprint 9.

In a preferred embodiment, the system of the present invention provides a default compiler which automatically calculates characteristics of a walking motion given footprint positions. Some of the characteristics calculated are balancing of the character as it is in motion between placements of its feet on alternating left and right footprints, the effects of gravity, skeletal constraints in the motion of the figure, natural balancing movements such as motion of the arms, torso, etc. Other features of the default compiler are discussed below in accordance with more complicated movements such as jumping, turning, etc. of a character animation.

The compiler is extremely flexible in that it will accept variations in parameters such as increasing or decreasing gravity, lengthening or shortening the skeletal structure of the character, performing various degrees of rendering the character from a crude line drawing to a smoothly shaded figure. The animation system provides many features, such as allowing the export of the animation sequence to a rendering program so that advanced techniques such as texture mapping and more detailed modelling can be used to render a more lifelike-looking figure.

Many different designs of such a compiler are possible, yielding slightly different results such as different idiosyncrasies in walking patterns. Any suitable method for compiling an animation sequence is adaptable for use with the present invention, which focusses on footstep and keyframe based animation.

Figure 10:
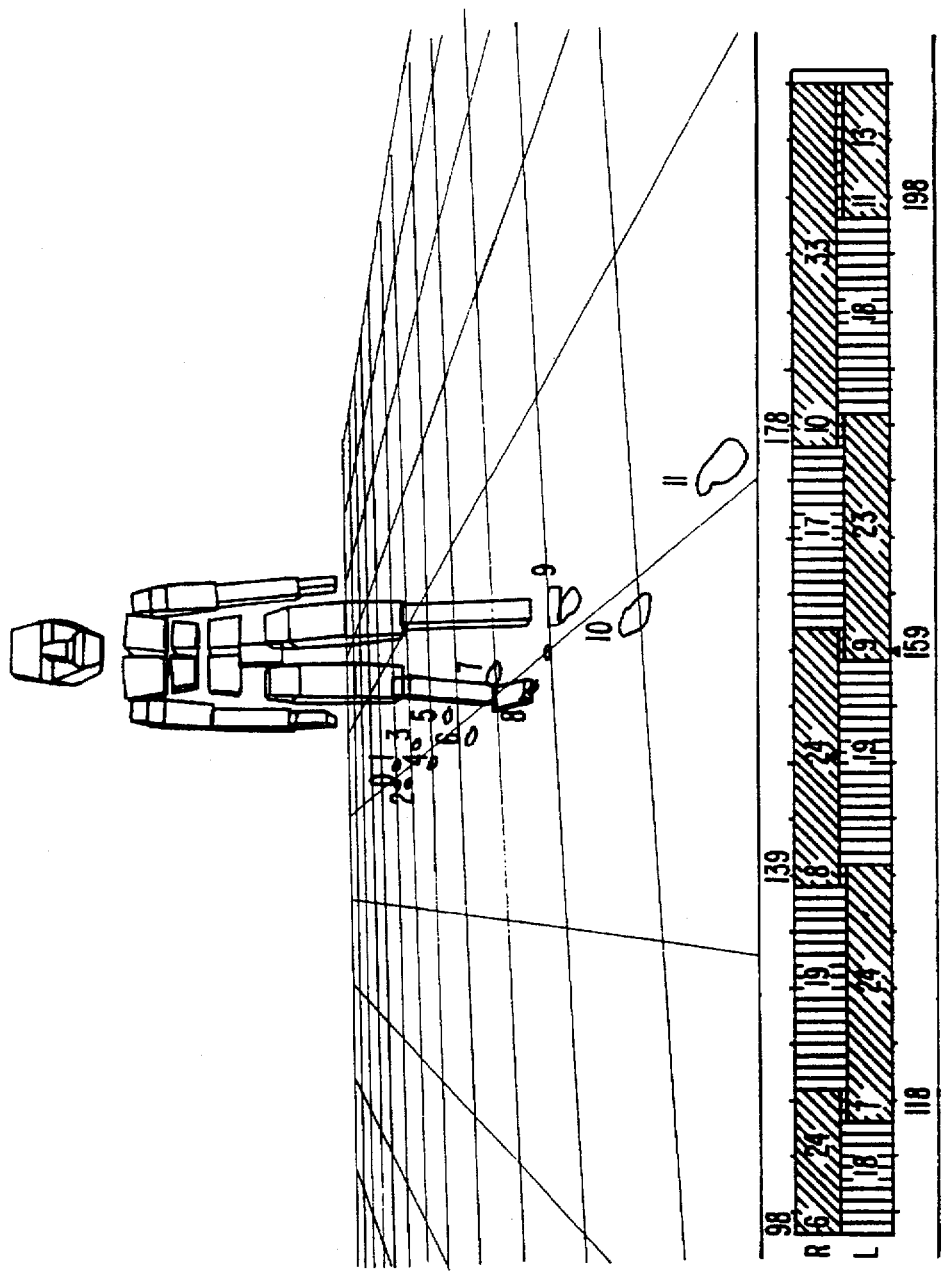
FIG. 10 is a screen shot of yet another frame in the walking sequence shown in FIGS. 7–9.

FIG. 10 shows yet another frame in the walking sequence discussed above regarding FIGS. 7–9. In FIG. 10, the character is shown with its right foot leaving footprint 8 and its left foot entering footprint 9. This is in accordance with the animation which has progressed to frame 159 which is toward the end of footprint block 8 and toward the beginning of footprint block 9.

Thus, the discussion above in connection with FIGS. 7–10 shows how a character animation is compiled using previously placed footprints to specify the walking pattern. As discussed below, the placement and editing of footprints are an extremely simple and efficient way to specify complicated motions of character animation which, when used in conjunction with a compiler, yield lifelike character animations for two-legged characters with a minimum of effort by the animator, or computer user. While the present invention is being discussed in connection with a two-legged character, it will be readily seen that the techniques presented herein may be used with multi-legged characters with obvious modifications.

Footstep Editing

Next, FIGS. 11–14 will be discussed to show how footsteps can be edited to easily change the walking animation described above in connection with FIGS. 7–10.

Figure 11:
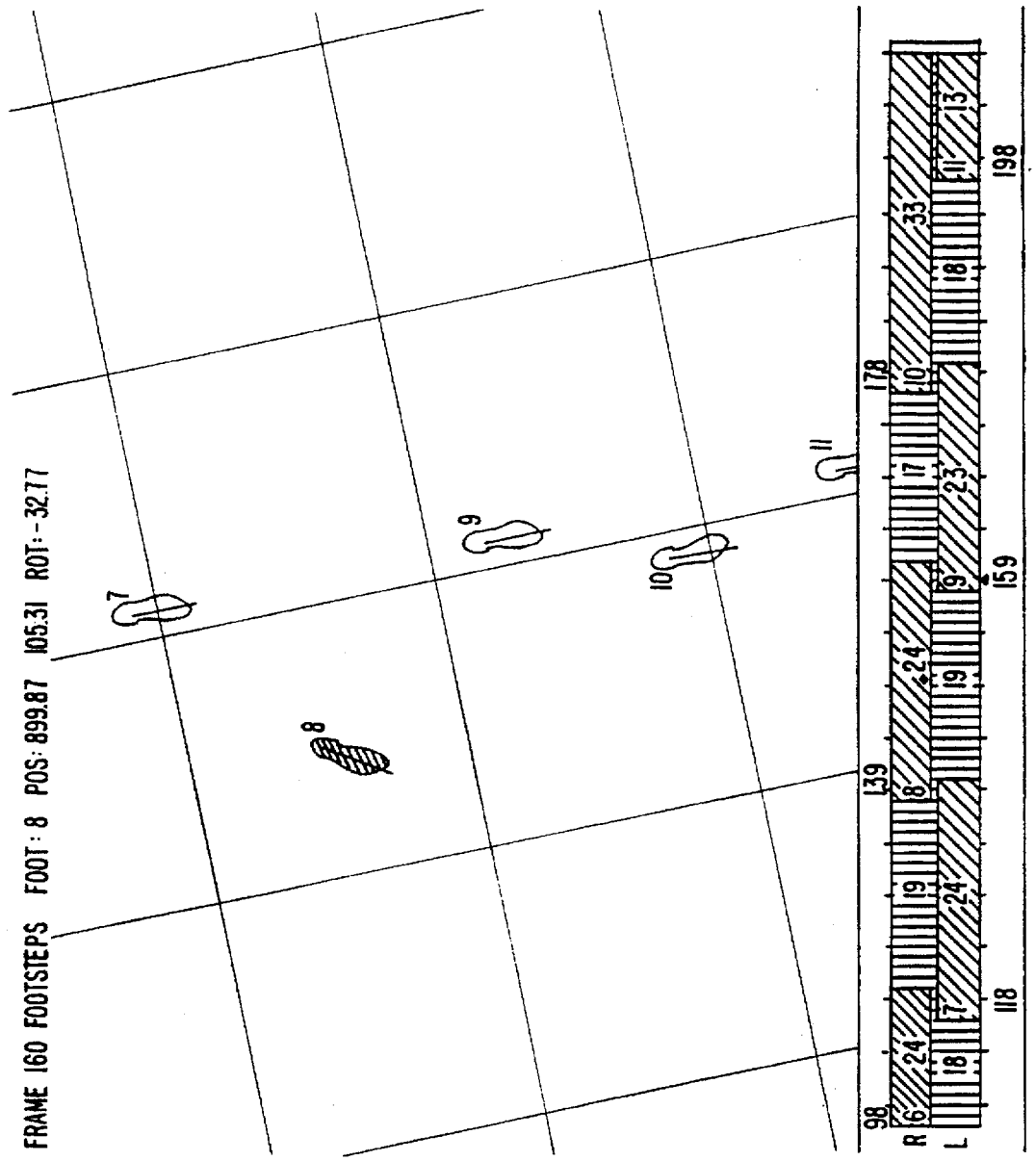
FIG. 11 is a screen display of an overhead view of the footprint surface with a footprint moved away the center line.

FIG. 11 shows a screen display, including a display window with an overhead view of footsteps similar to the footsteps of FIG. 7. However, in FIG. 11, footstep 8 has been shifted slightly so that it is moved away from the approximate center line of the walking path and oriented with the toe pointed more outward from the direction of the walk than in FIG. 7. The change in position and orientation of footstep 8 is by clicking and dragging with a pointing device such as a mouse. However, modification of footsteps can be by any means as are well known for moving graphical images on a computer display. Note that the only modification to footstep 8 is in its shift in position and orientation. This can be seen by noting that footstep block 8 is the same in FIG. 11 as it is in FIG. 7.

Figure 12:
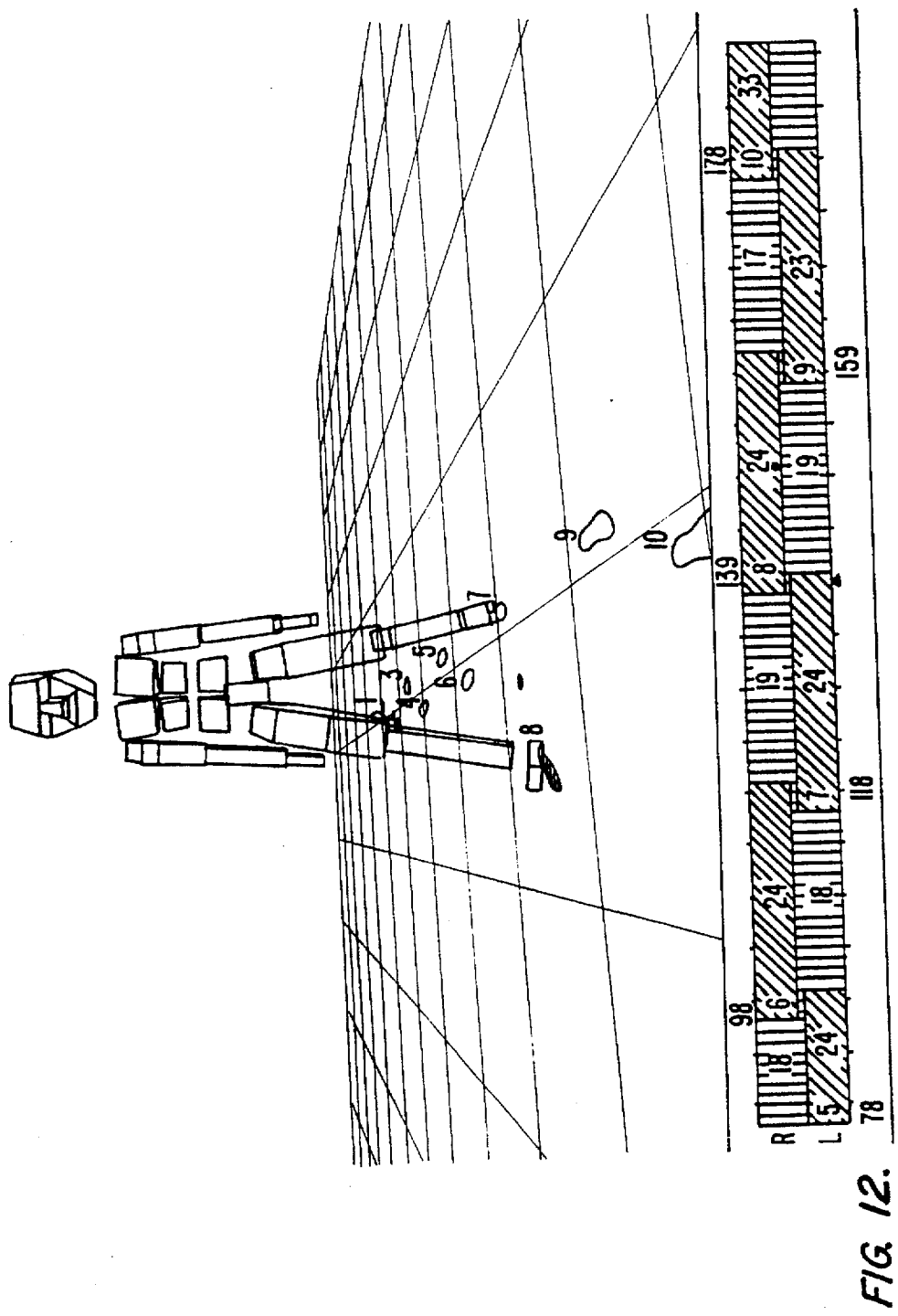
FIG. 12 is a screen display of a perspective view of the footprint surface showing the orientation of a character given the altered footstep of FIG. 11.

FIG. 12 shows a frame from the sequence of the walking animation with the modified footstep 8. In FIG. 12, the animation is currently at frame 139 similar to FIG. 8 where the animation was also at frame 139. However, in FIG. 12, since footstep 8 has been modified, the character must move off the walking path to the right in order to have its foot placed in contact with footstep 8 beginning at frame 138 and continuing the contact up to frame 161. As can be seen by comparing the display windows of FIGS. 8 and 12, the character has shifted its body position by taking a wider-spaced stance between positions of its left and right feet. The character in FIG. 12 is also oriented more towards the left as seen from the point of view of the observer and has its torso and head oriented slightly towards the left. This is a natural result of the modification of footstep 8. That is, the slight modifications in the orientation of the head, torso, and new positioning of the legs and feet is automatically performed by the compiler so that natural walking motion incorporating the modified footstep 8 is achieved. The effort on the part of the user in order to produce this anomaly is minimal, consisting of using the mouse to click and drag the footstep and then clicking near the tip of the center line to rotate the orientation of the footstep.

Figure 13:
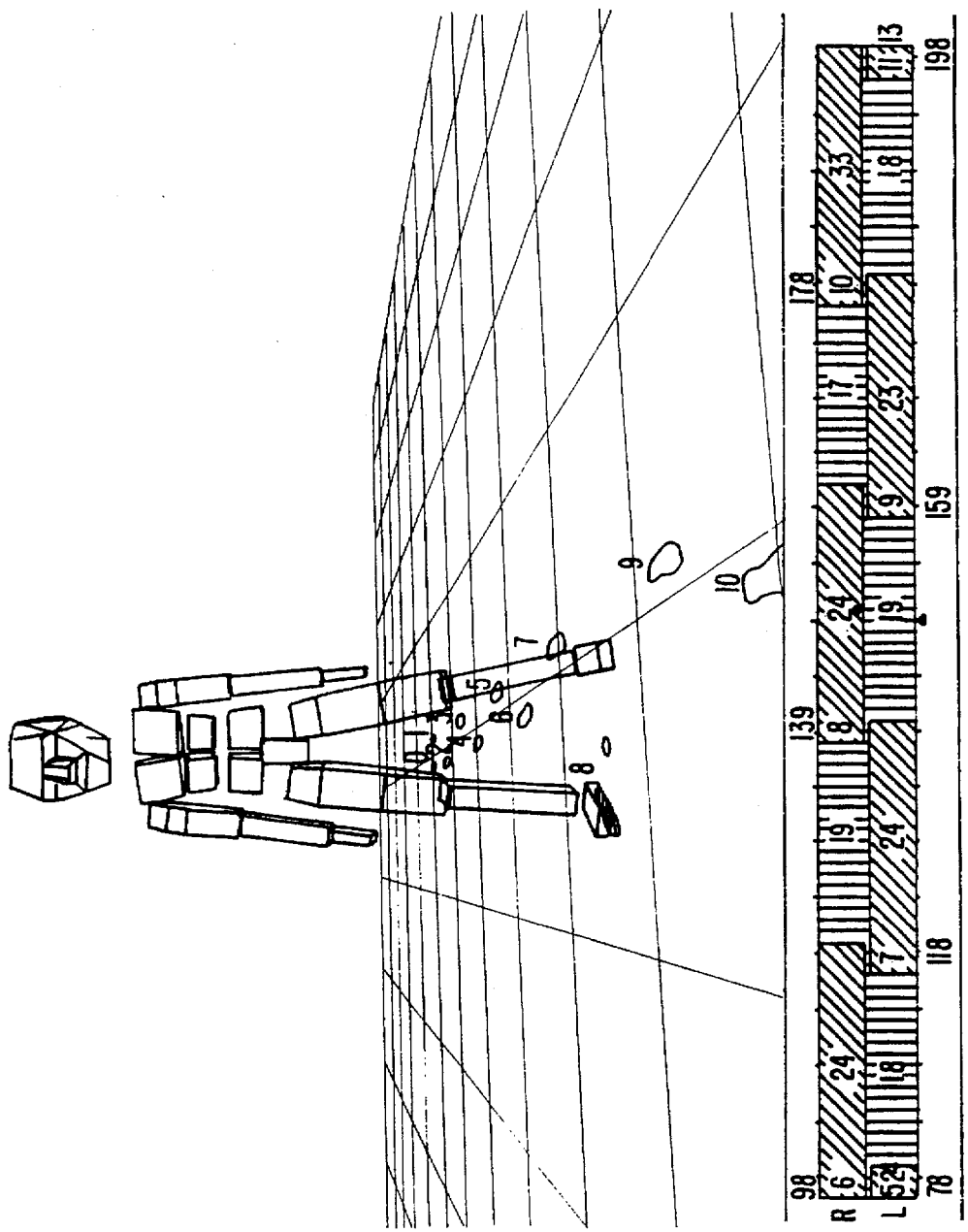
FIG. 13 is a screens shot of the perspective view showing the character of FIG. 12 shifting its weight to meet a footstep.

FIG. 13 shows the animation of the modified walk as it appears at frame 149. Note that this differs from FIG. 9 as the character is shifting its weight in order to place its left foot in footstep 9. As in FIG. 9, the left foot is halfway between lifting itself from footstep 7 and placing itself into footstep 9. Note that in FIG. 13 the left foot has swung slightly to the left of the center line of the walking path. This is due to natural balance compensation that would occur in a bipedal figure in attempting the motion of taking a wide step and placing a right foot as shown on footstep 8 while continuing with the left foot patterns of footsteps 7 and 9.

While not apparent from the figures, the forward velocity of the character is different for the walking animations described by the definitions of footsteps in FIGS. 7–10 and in FIGS. 11–14. The movement of the character in the animation of FIGS. 11–14 is faster since it must place its right foot rather quickly off to the side to meet the requirements of footstep 8 while also placing its left foot in footstep 9. Although the timing of each animation's footsteps are the same, the character must travel a greater distance in FIGS. 11–14 and, therefore, must move more quickly in the same time period. This increase in speed would also be seen similarly if a real human were to imitate the footsteps shown in FIGS. 11–14.

Figure 14:
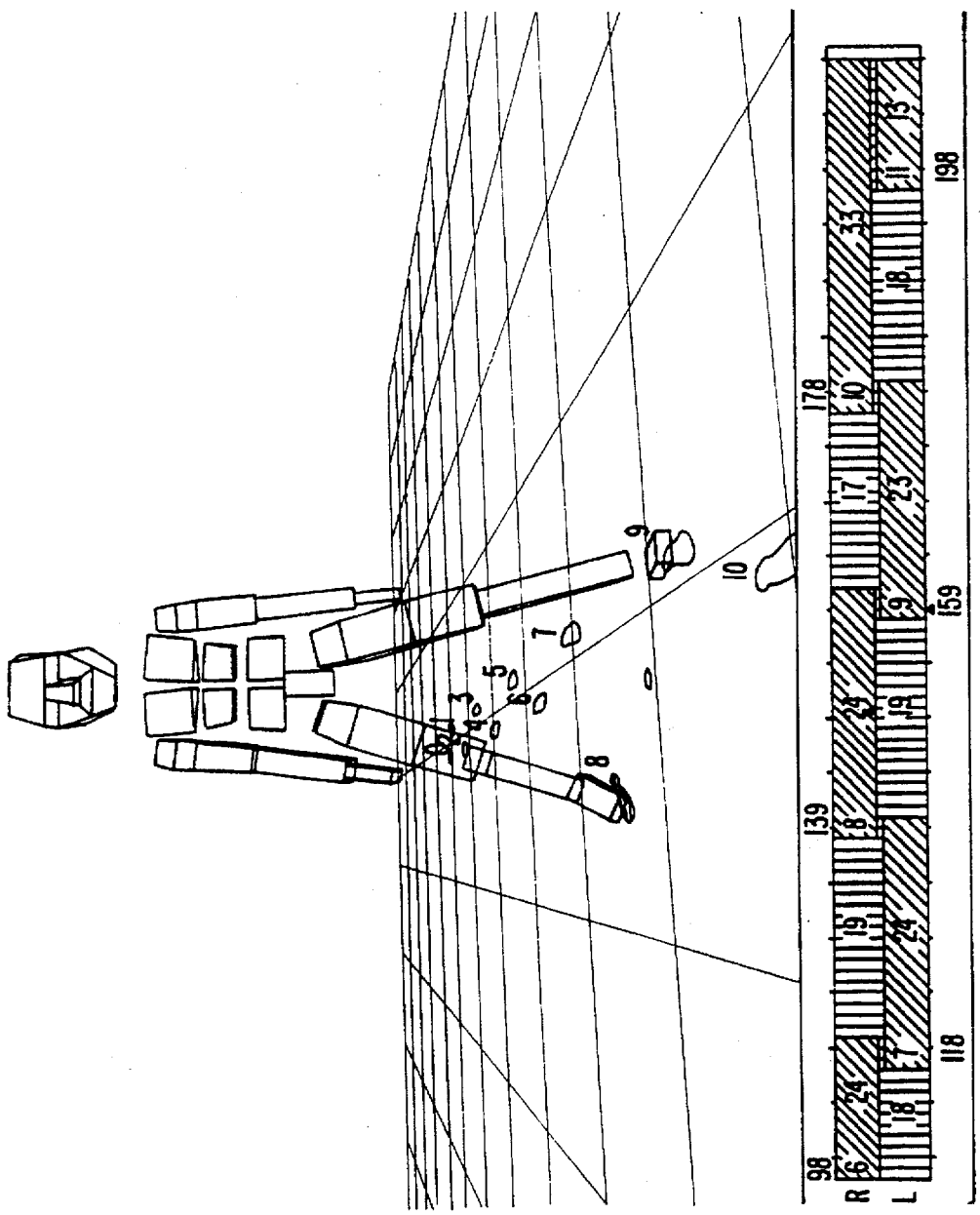
FIG. 14 is a screen shot of a frame following in the sequence of FIG. 13 illustrating the character moving back to the center line.

Finally, FIG. 14 shows the character at frame 159 of the modified walking animation. This is similar to FIG. 10 which shows the character at frame 159 in the original walking path. In FIG. 14, the animation is one frame into footstep block 9 so that the character's heel, as in FIG. 10, has just been placed in contact with the footstep while the toe portion, or forward portion, of the foot has not yet made contact.

Specifying A Jumping Motion

Next, FIGS. 15–18 will be discussed to show how a jumping motion is automatically animated merely by specifying footsteps in a certain way.

Figure 15:
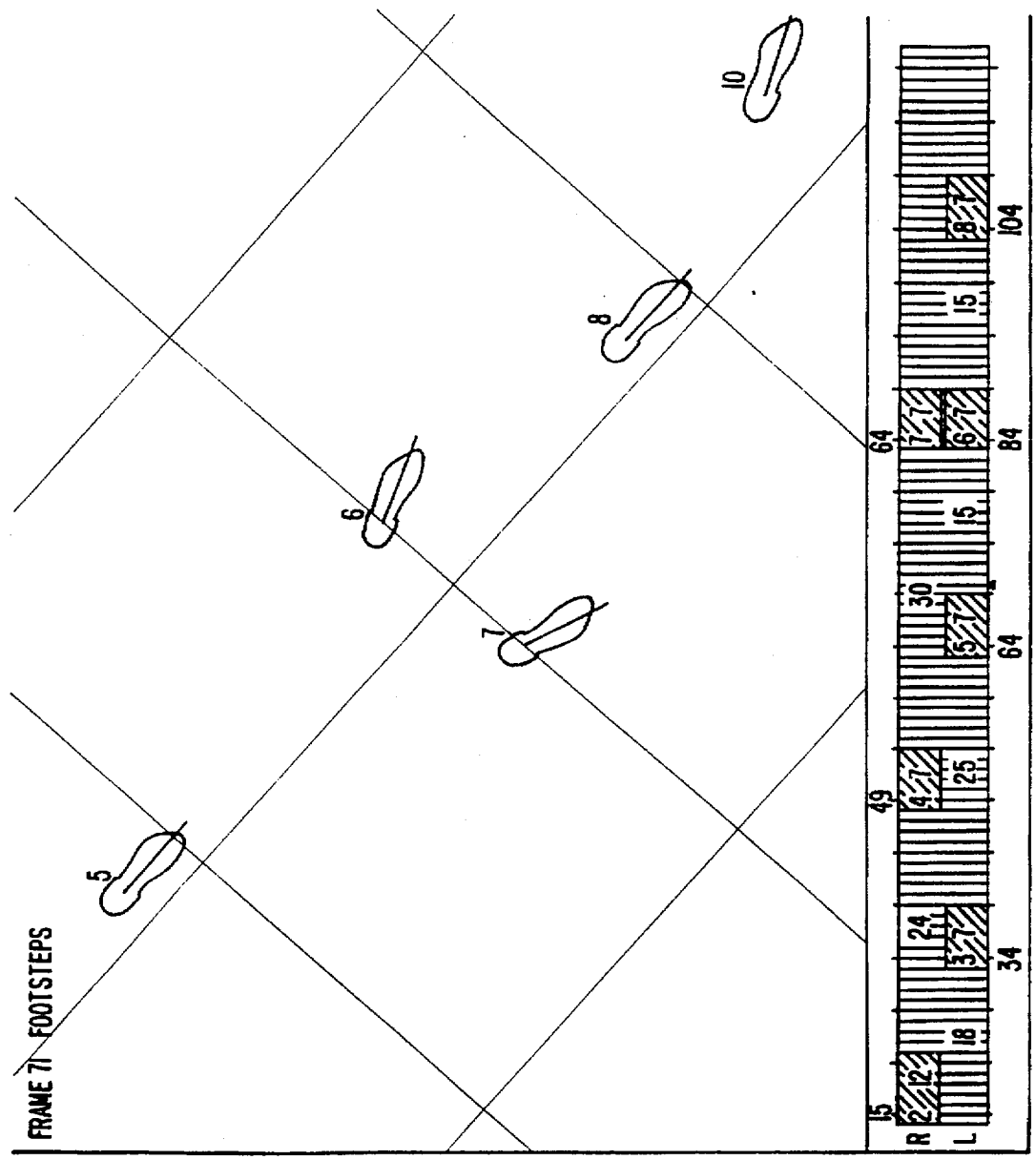
FIG. 15 is a screen display of an overhead view of the footprint surface and a timing diagram of footprints having non-overlapping frames where the character is not at a footstep, and therefore must be jumping.

FIG. 15 shows a screen display with an overhead view of footsteps in the display window. These footsteps define a hopping and jumping motion as opposed to the walking motion described in FIGS. 7–10 and in FIGS. 11–14. This is evident by noting the footstep blocks in the timeline of FIG. 15. Note that none of the footstep blocks, save for footstep blocks 6 and 7, Overlap each other. That is, none of the footstep blocks, except for blocks 6 and 7, require left and right feet to be on the ground in the same frame. Thus, in order for the character to move from footstep, e.g., footstep 2 to footstep 3, the character must hop so that both feet are in the air and not in contact with any footstep.

Sliding motion between two footstep locations could be designated in the timeline with blocks that have two footstep indices, one on each end of the block. The sliding period may be demarcated by an inner block having a darker color. For example, for a slide between a right footstep 1 and 2 in which footstep 1 is held for 3 frames, slides for 10 frames, and holds at footstep 2 for 5 frames, we would see a light red for 3 frames with the number 2 over it, followed by a dark red for 10 frames, followed by a light red for 5 frames with the number 2 over it.

The compiler automatically detects occurrences where neither foot is contacting a footstep at a given point in the animation sequence and assumes that this is an instruction to have the character hop or jump. Thus, the character will hop from its right foot at footstep 2 onto its left foot in footstep 3. The character will also hop from left footstep 3 to right footstep 4, right footstep 4 to left footstep 5, and from left footstep 5 to land on both feet simultaneously at footsteps 6 and 7. Next, the character will hop so that its left foot lands in footstep 8 and so on. The compiler automatically notes the number of frames between left and right foot contacts on the surface and adjusts the character's forcefulness (taking into consideration the specified gravity) so that the hops and jumps are animated in a natural way.

Figure 16:
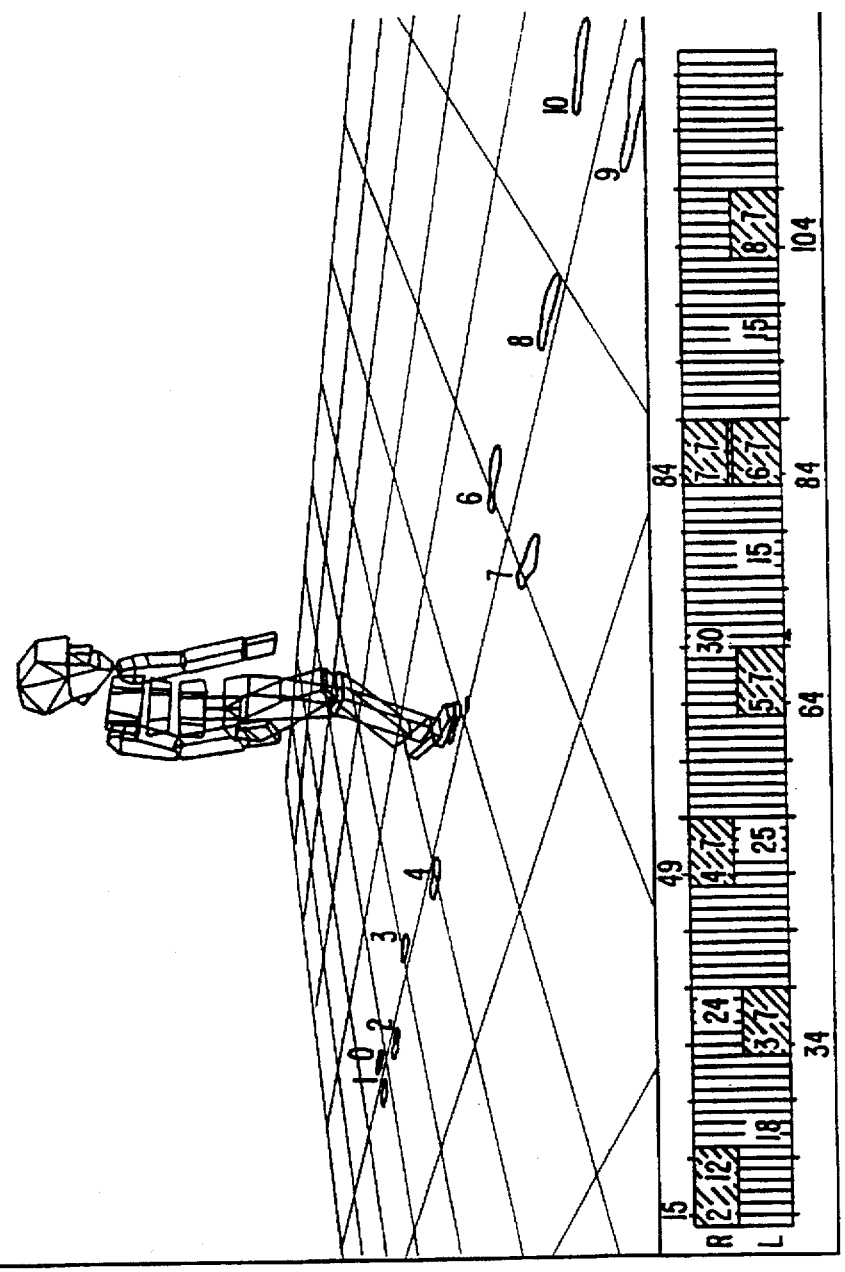
FIG. 16 is a screen shot of a perspective view showing an animated character following the footsteps shown in FIG. 15.

FIG. 16 shows the animation of the hopping and jumping sequence at frame 70. Note that the character is on its left foot in footstep 5 and is about to jump into footsteps 6 and 7. The compiler automatically calculates the default balancing, arm motions and head motions, etc. of the character, similar to the compiler interpolation in the walking animations discussed above.

Figure 17:
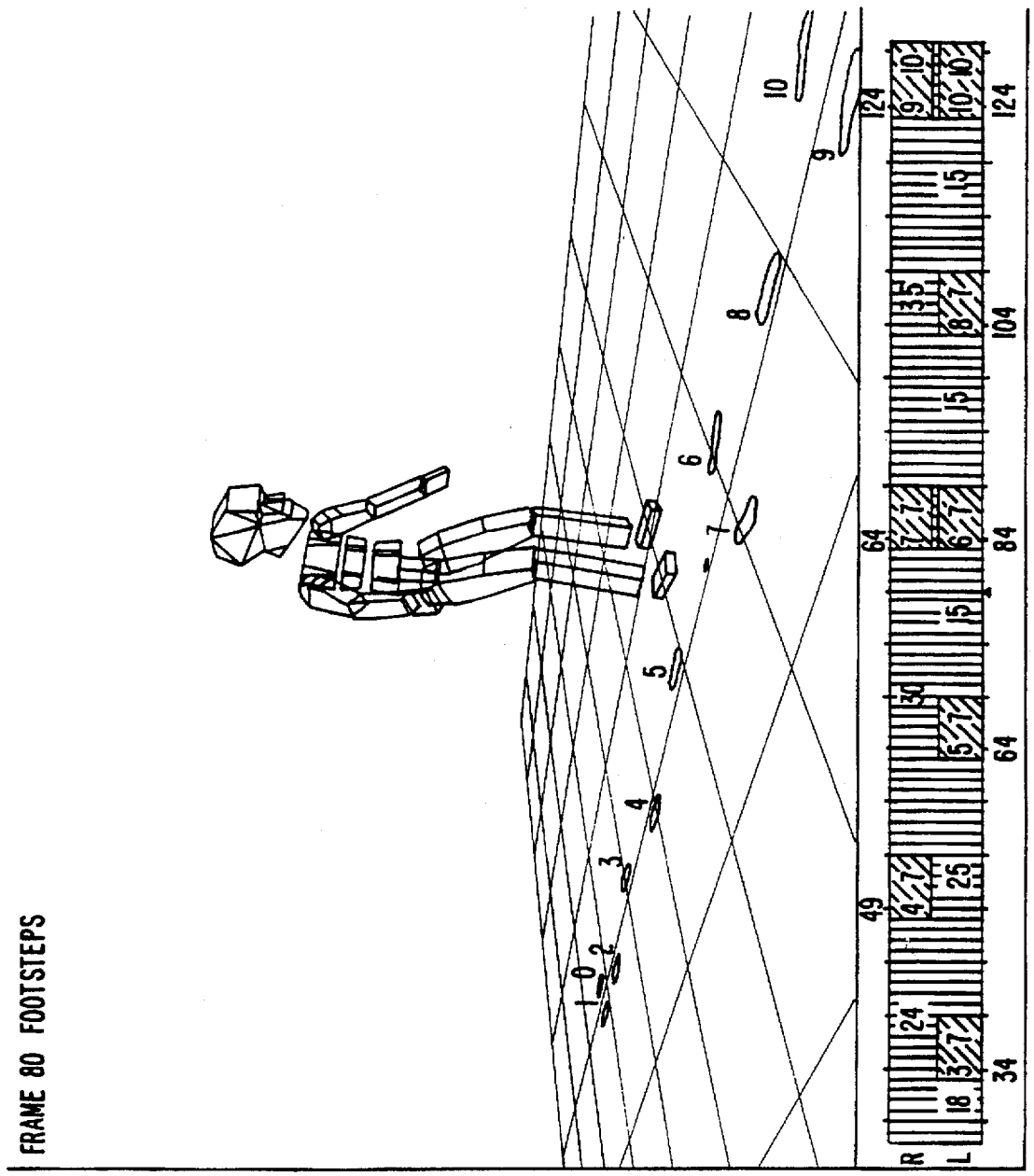
FIG. 17 is a screen shot of a perspective view of the footstep surface and the animated character in an airborne position as a consequence of a hop.

FIG. 17 shows the hopping and jumping animation at frame 79 where, according to footstep blocks on the timeline, neither of the character's feet are in contact with the footstep on the surface. Thus, the character is shown, in FIG. 17, in the air in mid-jump. Again, the character's body positioning emulates a life-like character's balance and positioning in mid-jump as if it were performed by a human.

Figure 18:
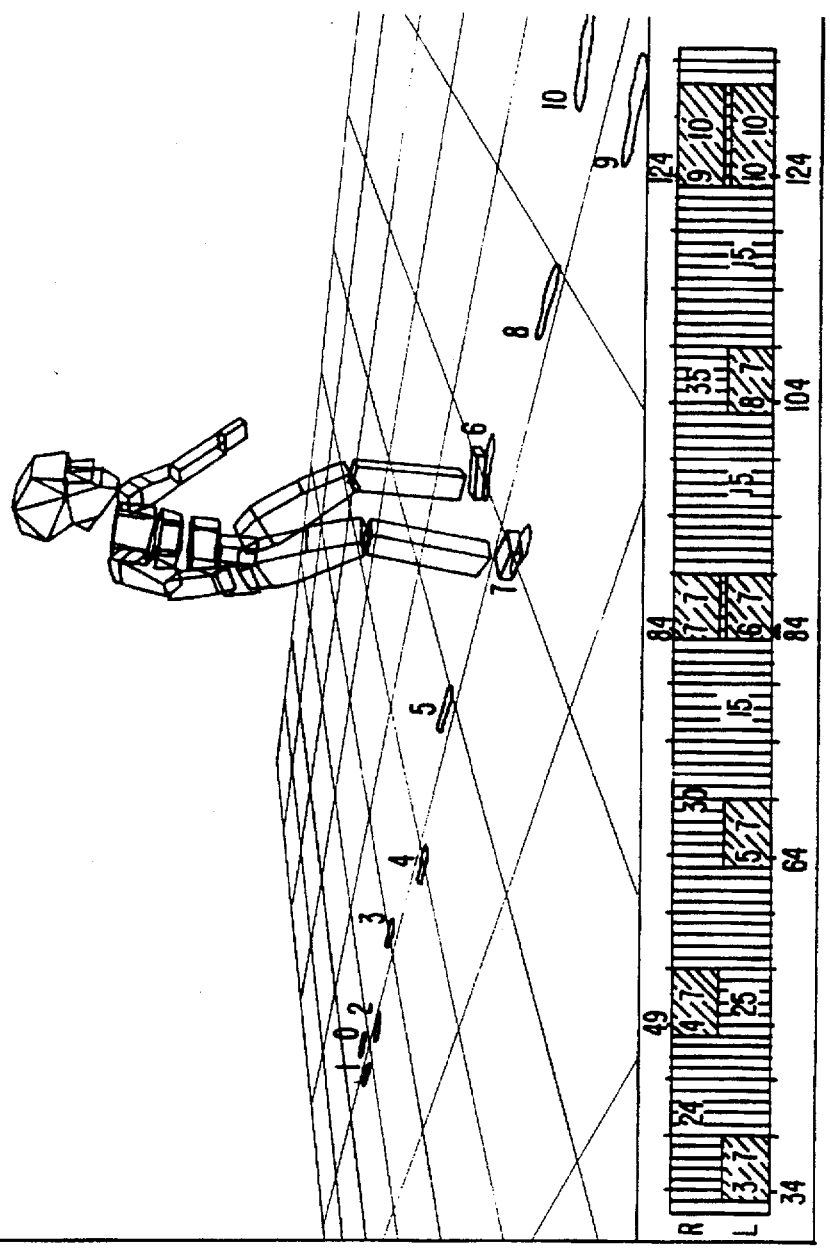
FIG. 18 is a screen shot os perspective view of a frame following that shown in FIG. 17, illustrating the landing of the character animation on footprints.

FIG. 18 shows the landing of the character one frame into each of the left and right footstep blocks for footsteps 6 and 7, respectively. Again, the compiler ensures that the positioning and motion appear natural, especially in terms of the deceleration of the character and the absorption of the shock as the character lands. Various parameters of the hopping and jumping motion can be easily modified by the user such as changing the gravity to be stronger or weaker than the default settings. For example, where gravity is said to be stronger than the default, the figure will have to jump more forcefully in order to remain in the air the same number of frames, resulting in a higher jump and a harder landing.

Another possibility is that the default for no foot contacting a footprint could mean that the compiler keeps one or both feet on the surface so that a sliding motion is animated.

Editing a Jumping Motion

FIGS. 19–22 will next be discussed to illustrate a modification to the hopping and jumping animation sequence discussed above in connection with FIGS. 15–18.

Figure 19:
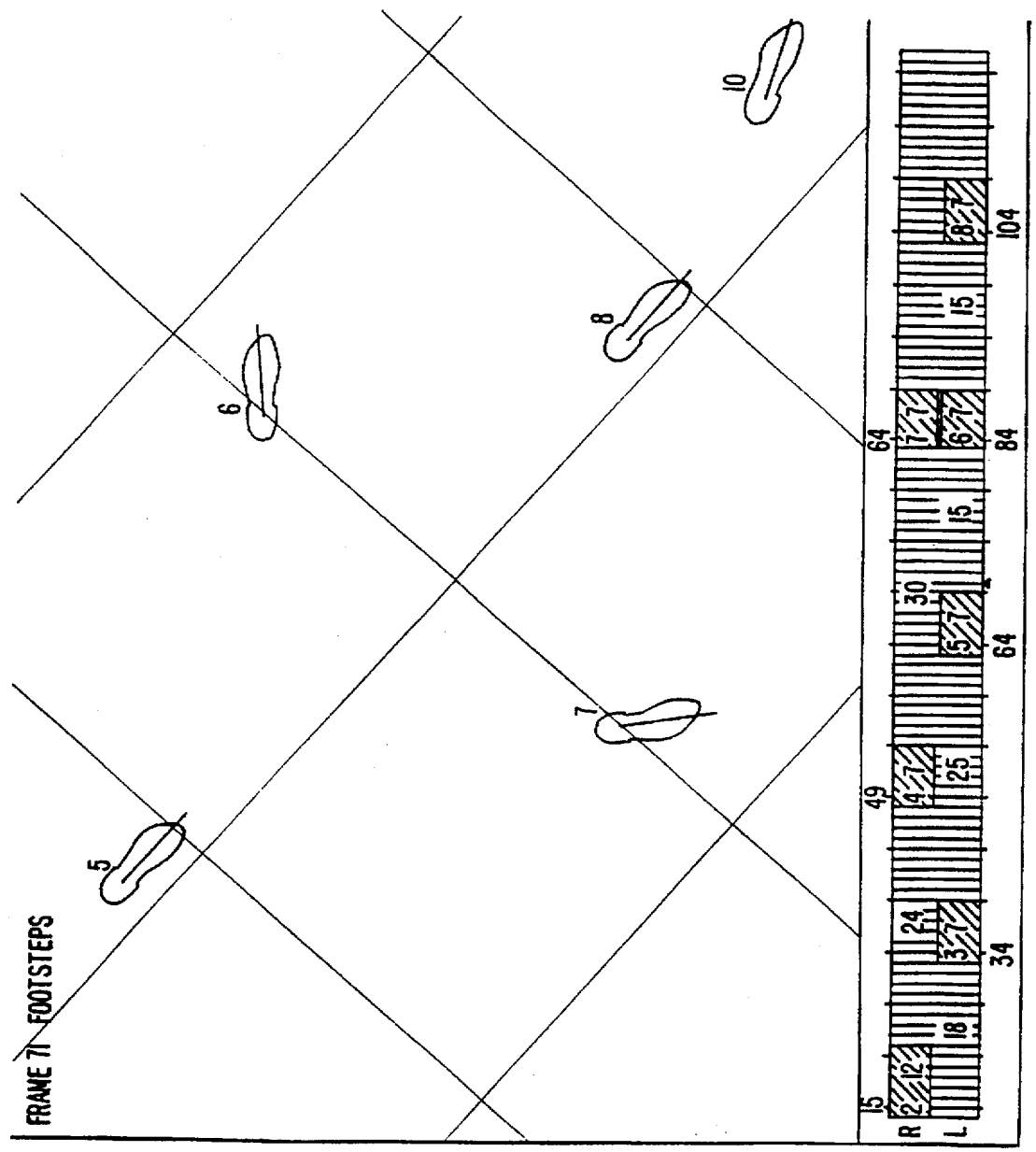
FIG. 19 is a screen shot of a overhead view of footprint surface and a footprint timing diagram with footprints edited relative to those of FIG. 15.

FIG. 19 shows an overhead view of the screen display including a display window showing footsteps similar to that of FIG. 15. In FIG. 19, footsteps 6 and 7 have been moved away from the center line of the characters' hopping and jumping path and have been rotated outward slightly so that the toes point more away from the center line than in FIG. 15. Note that footstep blocks 6 and 7 have not been modified so that the character will contact footsteps 6 and 7 at the same point in the animation sequence and for the same duration as before.

Figure 20:
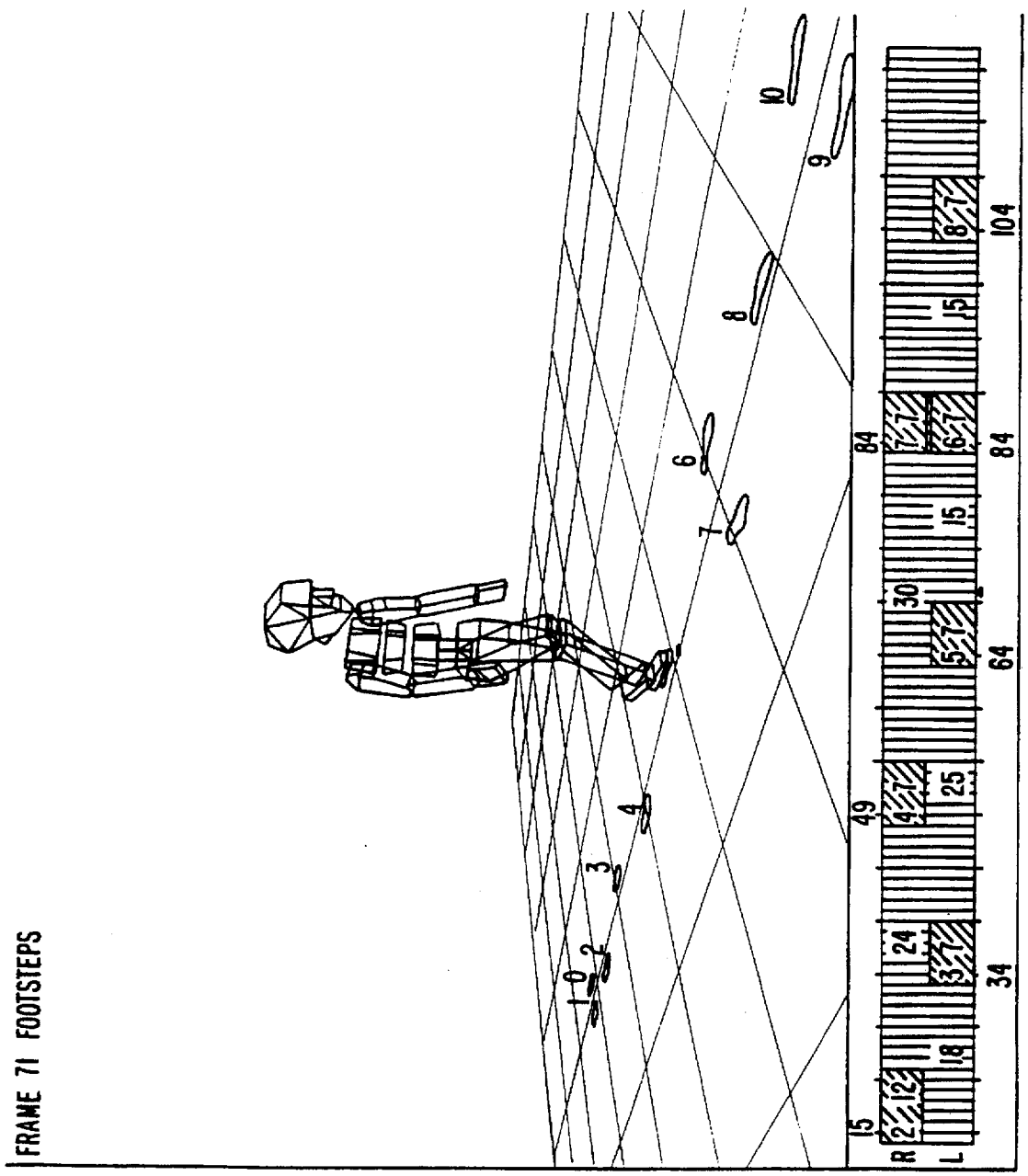
FIG. 20 is a perspective view of the character beginning a hop as indicated in FIG. 19.
Figure 21:
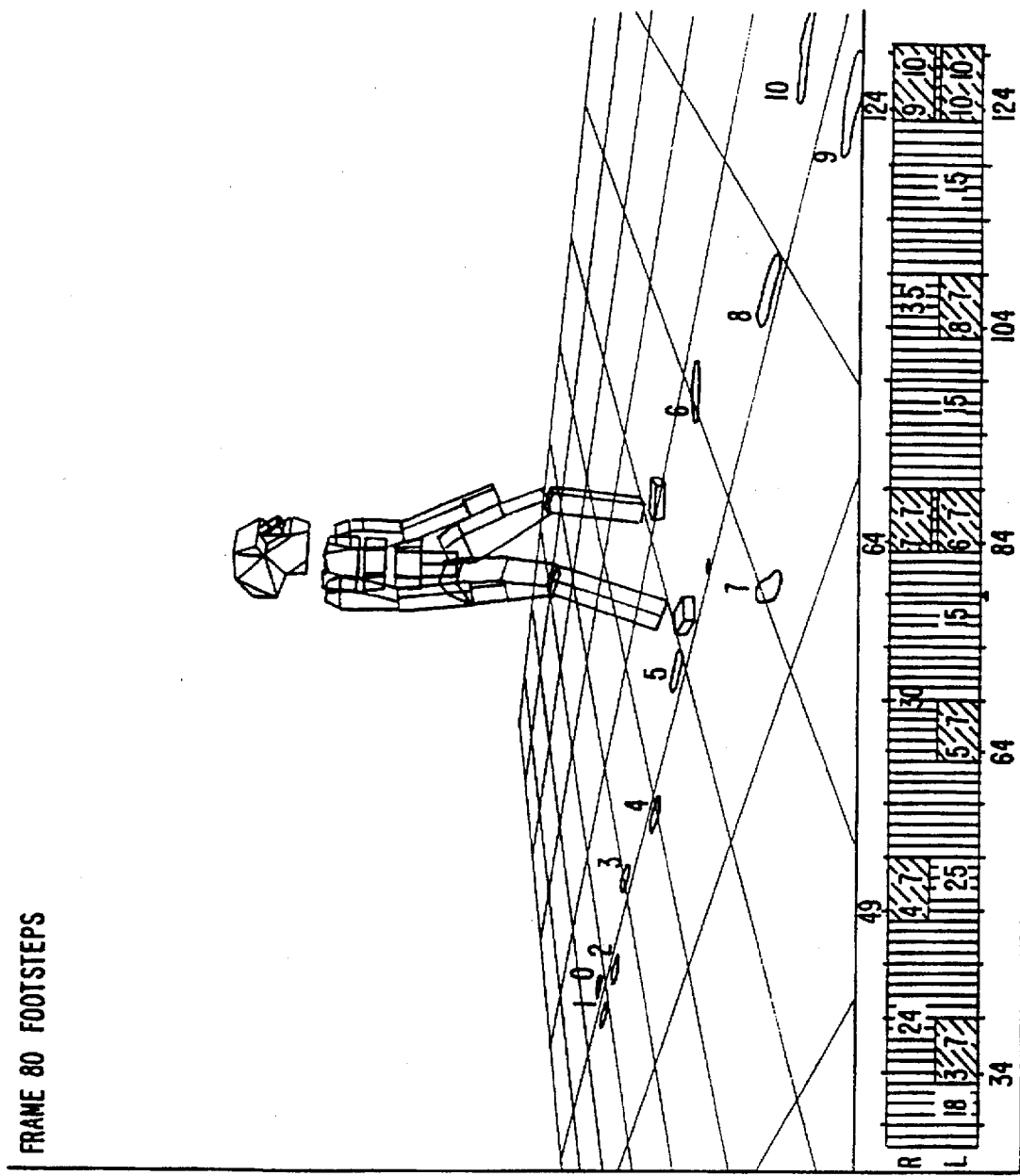
FIG. 21 is a perspective view of a screen shot of the animated character in the jump.
Figure 22:
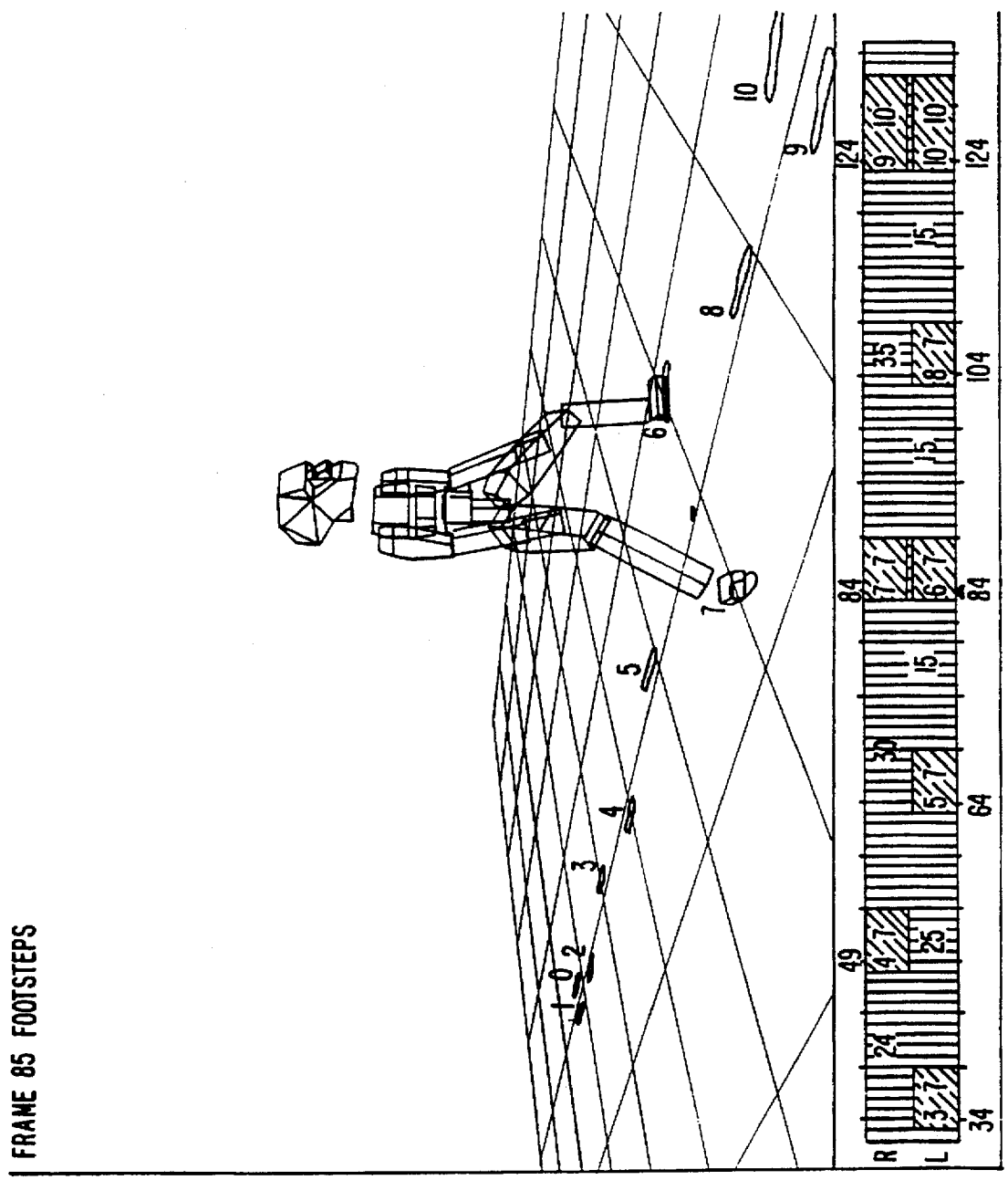
FIG. 22 is a screen shot perspective view showing the animation character landing at the edited footprints.

FIGS. 20, 21 and 22 show the animation in progress similar to FIGS. 16, 17 and 18. The character is shown preparing to jump at frame 70 in FIG. 20. The character is shown about halfway through the jump at frame 79 in FIG. 21 and is shown having landed on modified footsteps 6 and 7 in FIG. 22. Notice that in FIG. 22 the characters' legs are spread wider apart and its feet are rotated away from the center line of its path so that the character's landing in FIG. 21 appears quite different from the previous landing of FIG. 18. All of the changes in the figures' animation are a result of the user's simple modification of the placement of footsteps 6 and 7 in FIG. 19. The movement and reorienting of footsteps 6 and 7 is performed by the user with only a few mouse movements by clicking on, dragging and rotating the footsteps.

Footstep Timeline Editing

Next, FIGS. 23–28 are discussed to illustrate editing footstep blocks in order to change the character animation.

Figure 23:
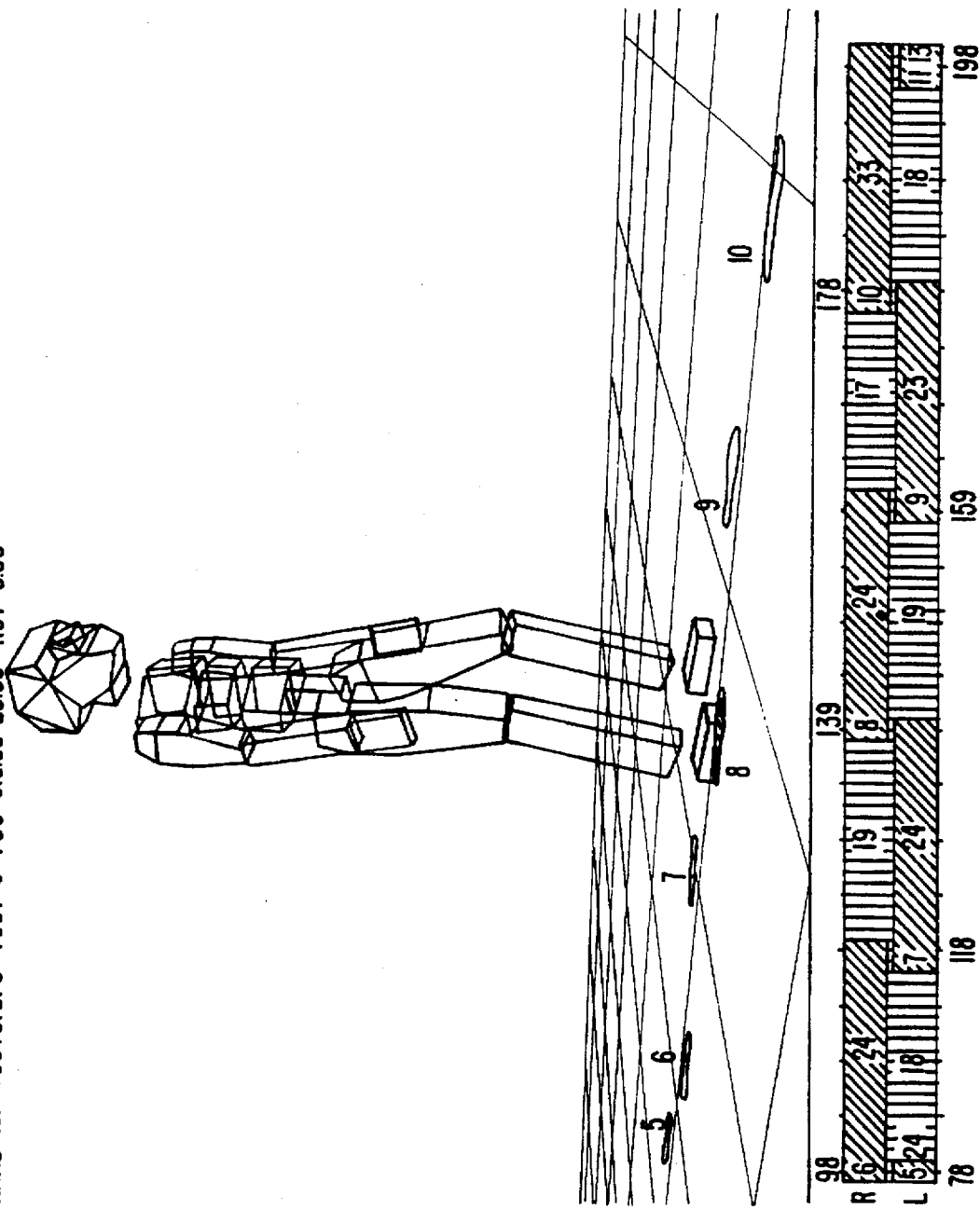
FIGS. 23–25 are screen shots of a perspective view of the footprint surface and the animation character and the footprint timeline illustrating a walking sequence and showing a placed right foot and airborne left foot.
Figure 24:
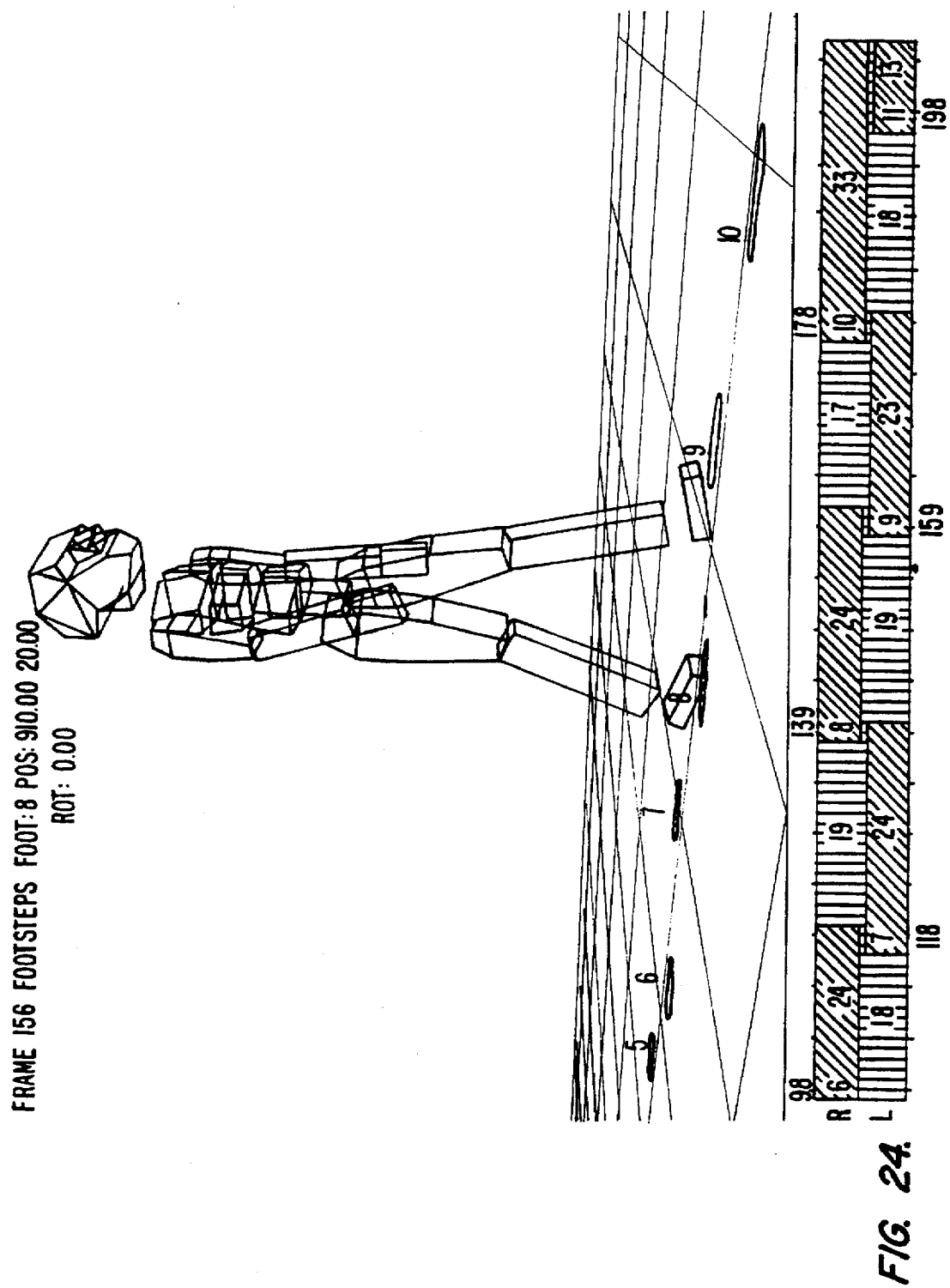
Figure 25:
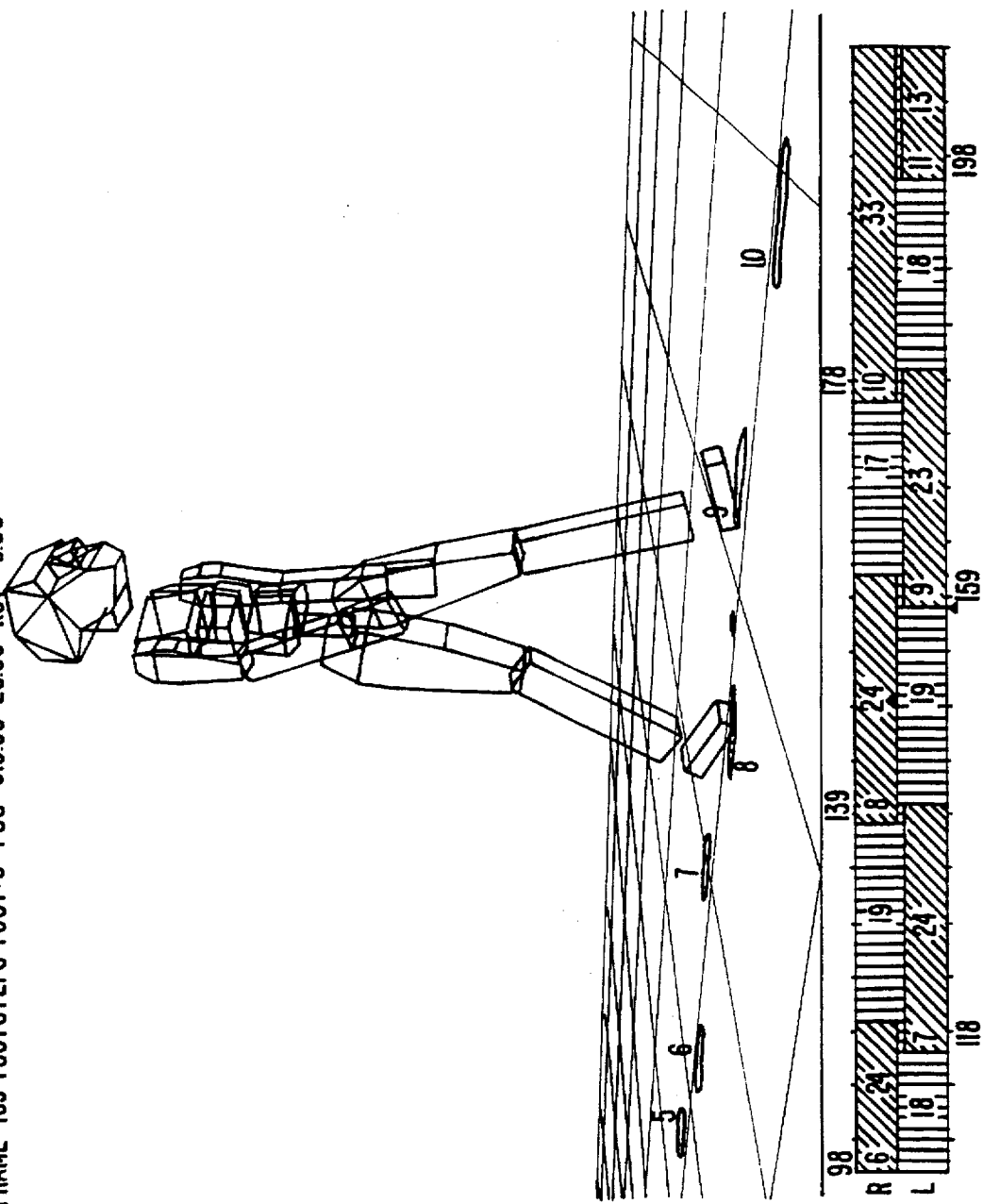

FIGS. 23–25 show three frames in a character animation sequence of a simple walking movement where the character is stepping from right footprint 8 into left footprint 9. Thus, FIG. 23 shows the character with its right foot placed squarely on footprint 8 and the timeline shows that the animation has progressed approximately halfway through footprint block 8.

In FIG. 24, the character is about to place its left foot onto footprint 9 and the character animation has progressed a few frames from that of FIG. 23.

In FIG. 25, the character has just made contact with its left foot in footprint 9 at frame 158 of the animation.

Figure 26:
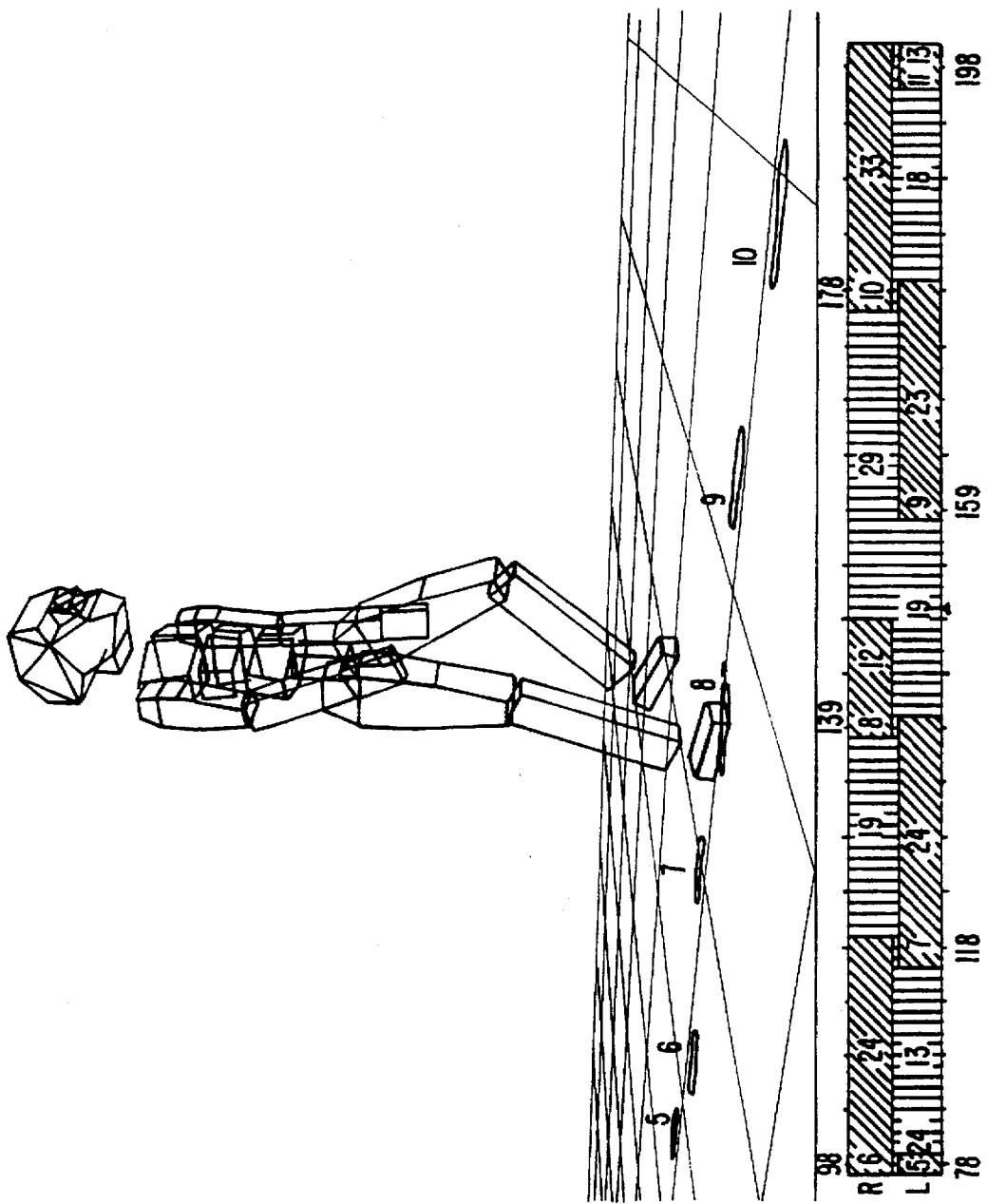
FIG. 26 is a screen shot similar to that of FIG. 23, showing an edited footprint timing diagram with a footprint foreshortened.
Figure 27:
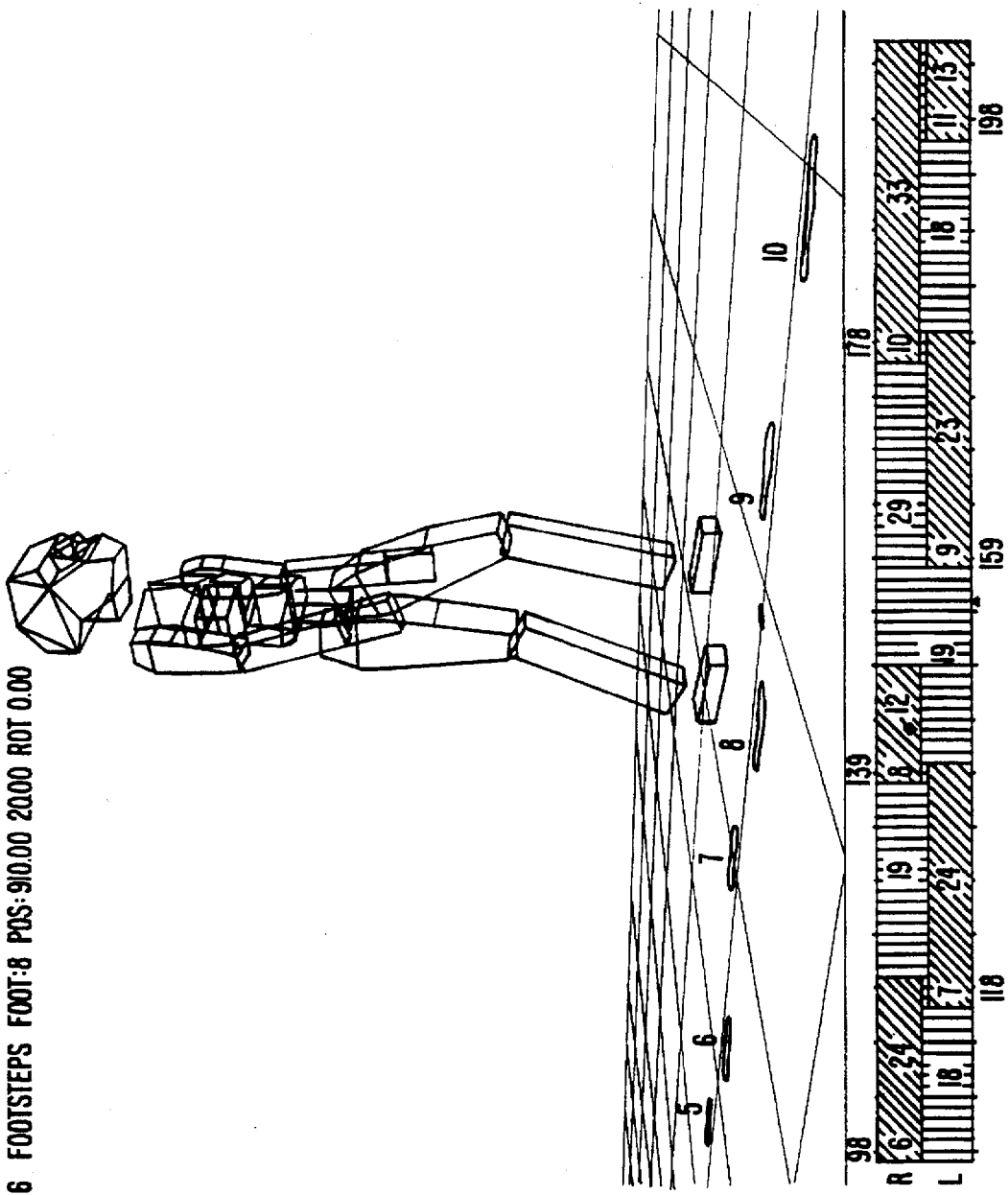
FIG. 27 is a screen shot of a perspective view showing the effects of the foreshortened footprint in creating a jump in a walk sequence.
Figure 28:
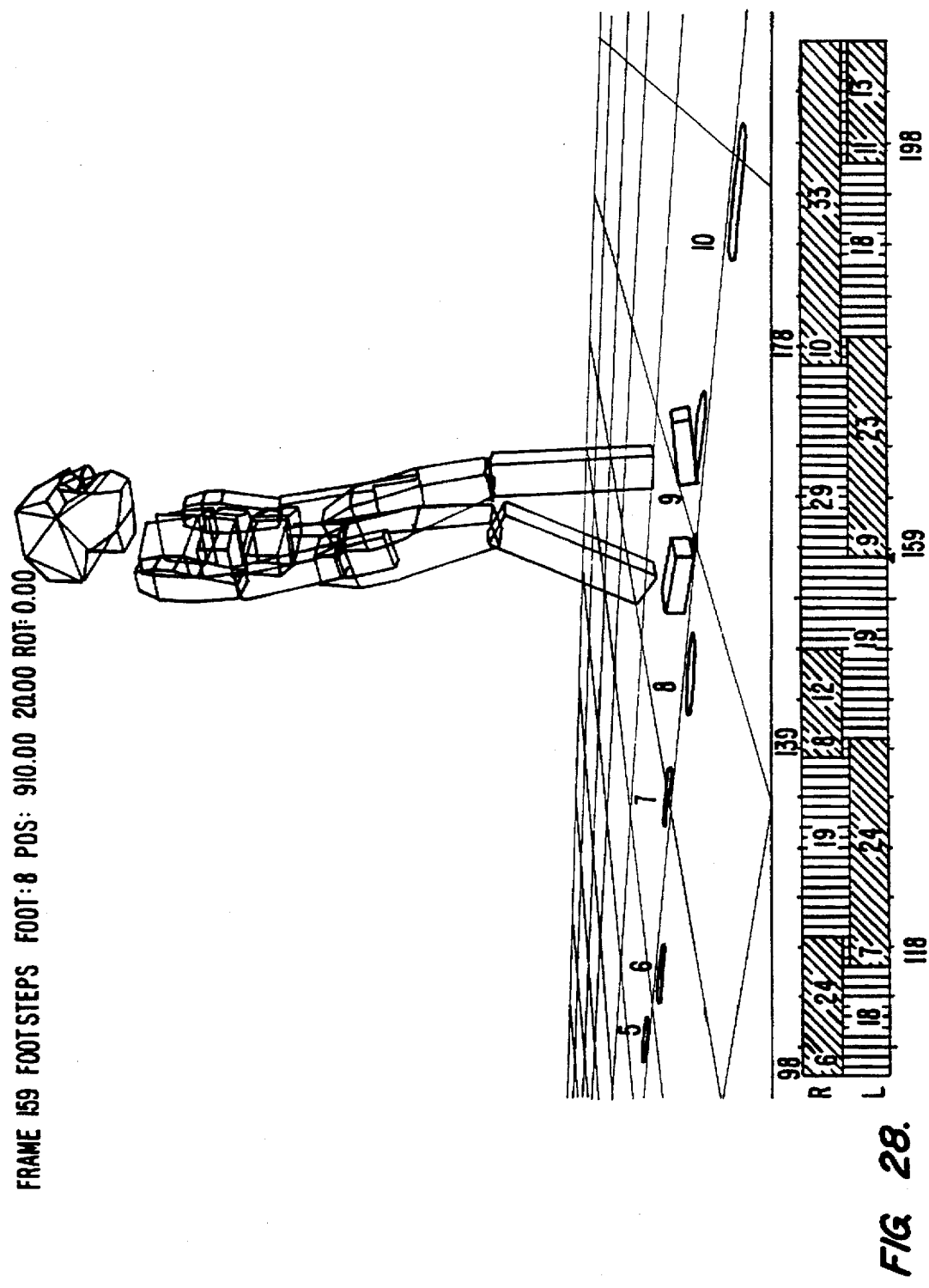
FIG. 28 is a screen shot of a perspective view showing the animated character landing.

In FIGS. 26–28, footprint block 8 has been modified so that it is now much shorter in length (i.e., duration of contact) than before. Specifically, the latter portion of footprint block 8 has been effectively truncated as footprint block 8 has been shortened. The method for shortening footprint blocks is by clicking and dragging either the left or right edges of the block with the mouse. In a preferred embodiment, left and right arrows appear when the cursor is near a left or right edge. The arrows indicate that depressing the mouse button will cause the edge to be dragged, thus shortening or lengthening the block.

Any number of means may be employed to allow a user to modify footprint blocks on the timeline. The change in duration of footprint block 8 results in an automatic change in the animation generated by the default compiler. As before, the compiler assumes that where both of the character's feet are off the ground at the same time, that a hop or a jump is being performed. Thus, for frames 151–158 the compiler will cause the character to be in the air.

FIG. 26 shows the character just after contact with footprint 8. Thus, the character is executing a hop and its right foot has just left the ground. Note that the character's body positioning is different from its position in FIG. 23 which is the same set of footprints and footprint blocks except for the modified footprint block 8. This is because in FIG. 26 the compiler has calculated the positioning of the characters' limbs and body so that the character executes a hop in the animation. FIG. 27 shows the animation at frame 155 where the character has both feet in the air about halfway through the hop.

FIG. 27 shows the character in mid-hop and FIG. 28 shows the character after having just completed the hop. Note that FIG. 27 is the same frame in the animation as FIG. 24 for the animation before modification to footprint block 8. Also, FIG. 28 corresponds to FIG. 25 in that both figures show frame 158 of their respective animation sequences. FIG. 28 is different from FIG. 25 since the compiler has calculated body positioning for a landing from a hop, thus the character is more directly over footprint 9 and its left foot is poised to absorb the shock of the landing. In FIG. 28 the character's arms are not swinging unlike the swinging motion in FIG. 25 which is normal for walking but not for hopping and landing. Also, in FIG. 28 the characters' right foot and leg are free and slightly flexed, not supporting any weight. In the actual animation sequence, the character's hopping and landing movements thus appear natural. The change in the animation from the sequence of FIGS. 23–25 to that of FIGS. 26–28 is substantial although it requires very little effort on the part of the user to accomplish the change.

The general speed of the character's center of gravity is similar for the animation sequences in both FIGS. 23–25 and in FIGS. 26–28, since the distance covered by the character is nearly identical for the same time period. However, during the ballistic motion in FIGS. 26–28 where the character's feet are both off the ground, the system insures that the center of gravity (in the absence of wind resistance) moves in a straight line at a constant speed, in keeping with the laws of Newtonian dynamics. By contrast, for the walking motion in FIGS. 23–25, the speed may change continuously, since foot contact forces may brought to bear during the entire motion.

Keyframe Editing

In the previous discussions of editing footsteps and animating the character with respect to the specified footstep positions and footstep blocks, the compiler makes assumptions about the characters' body positioning in order to create natural animation sequences of, e.g., walking, hopping, jumping, etc. This allows the user to quickly achieve basic natural-looking animations merely by positioning footprints and by modifying footprint blocks. If necessary, a greater degree of control can be asserted over the animation by the user's ability to edit keyframes in the animation sequence.

Although motions synthesized by the default compiler appear to be natural, the animator must alter and embellish the movement of different body parts in order to add idiosyncrasies that make the walking motion more expressive. Since only the keyframe tracks for each of the body parts are used during the physically-based interpolation of the character, it would be possible for the animator to modify, delete or insert keys that are in conflict with the original footstep constraints. However, the preferred embodiment of the present invention is able to detect when such violations have occurred (such as deleting all the right leg keys associated with a given step) and prevent only those modifications that are in violation. Examples of keyframe modifications of walking motions are altering leg and feet keys to create tip-toe creeping, altering the vertical height of pelvis and bending the spine to create the appearance of walking in a crouched position, or say, altering the spine and pelvic swing of the hips in order to mimic the walk of a fashion show model on a catwalk.

Once the user has added these motion idiosyncrasies with user-defined keys (through the use of replace/insert/delete operations), it is possible to adapt them to subsequent changes the user may still wish to make to the higher-level footstep specification. If the user alters the footstep locations or footstep timeline, the adaptive compiler retrofits the keyframe tracks to match the altered footsteps as closely as possible. This is made possible by the system's ability to initially compute and subsequently preserve a normalized mathematical mapping between the keyframes and their corresponding footstep locations and timeline.

In the case that the timeline is so fundamentally altered that the order of transitions between support states (right leg on ground, left leg on ground, both legs on ground, both legs in air) are changed, the system is able to localize those fundamental changes and replace that part of the movement with a default set of keys (e.g. if the user turns a running step into a walking step during a running sequence, only the newly introduced walking step will be composed of default keys).

The adaptive compiler is also able to adjust user-defined keyframes to accommodate changes to the dimensions and distribution of mass of the character and the magnitude of gravity. For example, this enables the mapping of a human character's keyframes of a dance in earth's gravity onto a chimpanzee doing the same dance under the influence of gravity on the moon.

Figure 29:
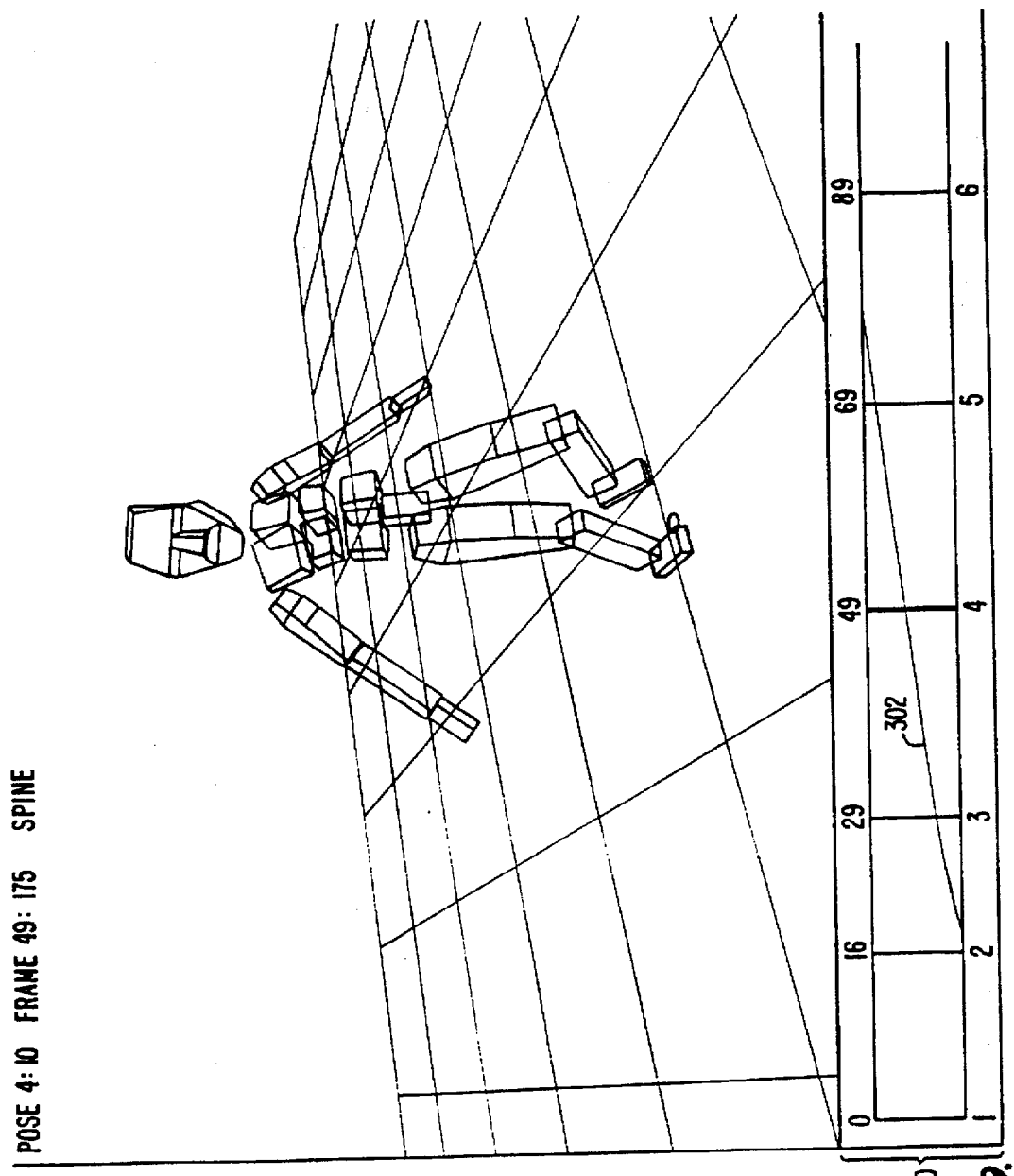
FIG. 29 is a screen shot of a perspective view of the reference surface, the animated character and an ease function plot.

FIG. 29 shows a screen display that includes a display window at the upper portion of the screen, as before, and a keyframe timeline at the lower portion of the screen at 300. Keyframe timeline includes absolute frame numbers at the top portion of keyframe timeline and includes keyframe numbers at the bottom portion. Each vertical mark represents a keyframe where the user has specified the position of one or more of the character's body parts. Additionally, the computer system might specify default keyframes such as the keyframe at frame 0 (keyframe 1).

Thus, keyframe 2 occurs at frame 16 in the animation sequence. In FIG. 29, keyframe 4 is shown in the display window as the current keyframe and is indicated with a bold vertical mark. Line 302 within the keyframe timeline represents a curve giving the user some information about an "ease function" that is a visual indicator of the interpolation dynamics for each of the character's body parts between keyframes.

The user may modify the shape of the ease function graph (referred to as the double interpolant) by altering the shape of the graph using general spline editing techniques. However, changes to the dynamics of the ease function that violate the requirements of physically-based interpolation (such as the figure speeding up while in the air), are easily detected and prevented during the user's manipulation of the ease function graph.

Figure 30:
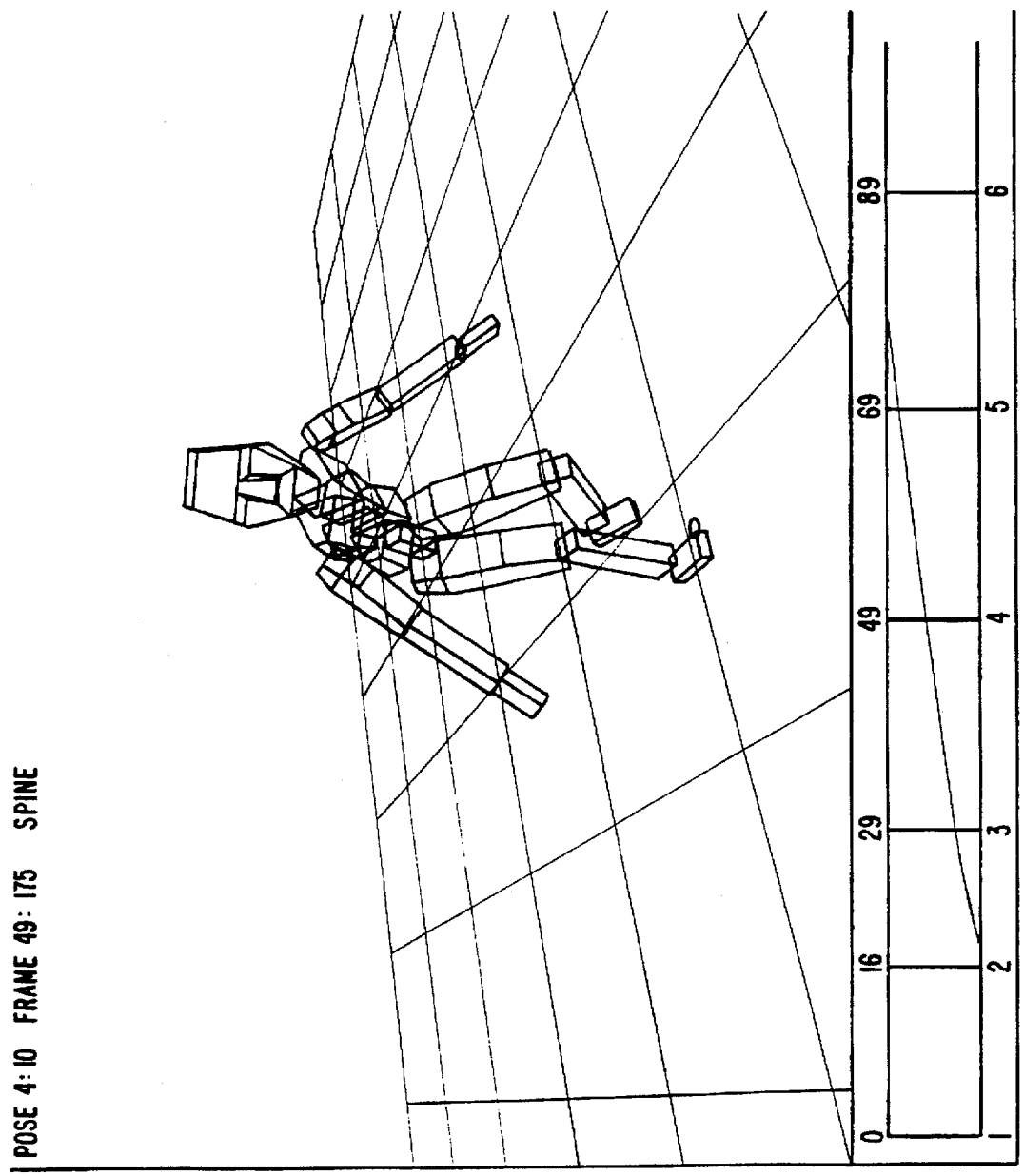
FIG. 30 is a screen shot similar to the that of FIG. 29 with modified portions of a keyframe.

FIG. 30 shows the same keyframe, keyframe 4 at frame 49, although the character animation appears different. This is because the user has modified various portions of the character to create a modified keyframe from the keyframe 4 shown in FIG. 29. In a preferred embodiment the user modifies different parts of the character by first selecting the character part with the mouse and pointer by clicking on the part. The part then becomes highlighted and the user is able to use the mouse or keyboard to move the parts in a variety of directions. These directions are constrained by the system to be anatomically correct, taking into account the skeletal characteristics of a human character and relationships of body parts to other parts. Alternatively, the compiler need not model a human skeleton and could be adapted for use for, e.g., animals or whimsical characters.

In FIG. 30, the only modification to the character in keyframe 4 is that its spine has been tilted forward. The system automatically adjusts the relative position of the pelvis to the character's point of contact with the ground in order to maintain balance with respect to the character's center of gravity. Thus, in the animation sequence specified by the keyframe timeline shown in FIGS. 29 and 30, the character will have the position of the new keyframe shown in FIG. 30 at keyframe 4, or 49 frames into the animation. Naturally, the animation system will generate different frames before and after the modified keyframe in the animation sequence in order to bring the character realistically into the position shown in keyframe 4. As before, the animation system achieves this by using physically based interpolation techniques that simulate the dynamic stability of the character as it moves through the modified key frame. Thus, the user is able to achieve a completely different animation sequence in an easy and efficient manner.

Figure 31:
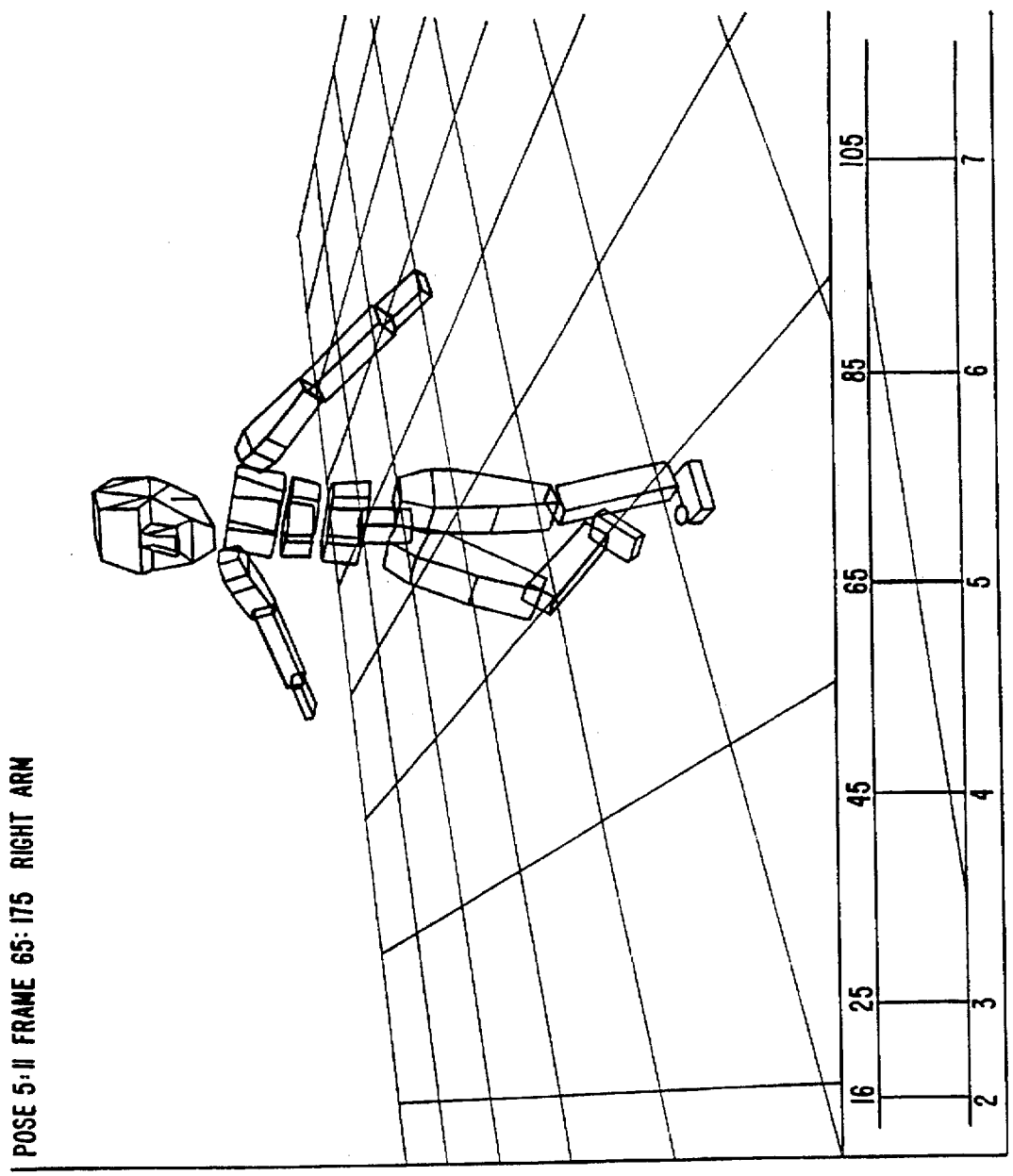
FIG. 31 is a screen shot showing a modification of the keyframe.
Figure 32:
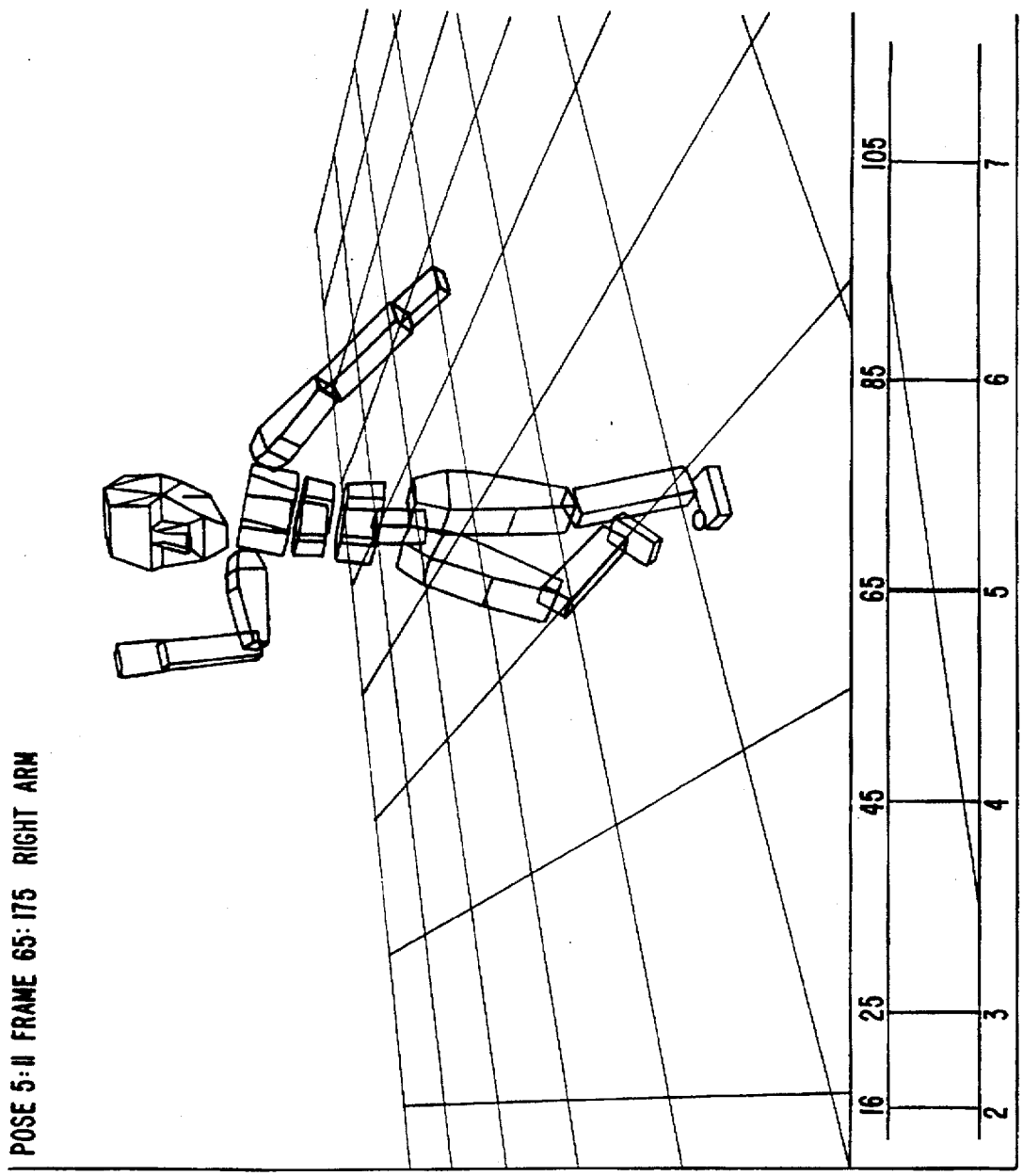
FIG. 32 is screen shot similar to that of FIG. 31, with a keyframe modified such that a character raises its arm.

FIGS. 31 and 32 show another instance of the keyframe modification. In this case, FIG. 31 shows an initial keyframe 5 with the character standing on its left leg while holding its arms slightly to the side. In FIG. 32 the character's position has been changed so that its right arm is now raised, being bent upright at the elbow in a waving motion. Thus, an animation using the modified keyframe 5 of FIG. 32 will have the character raising its right arm so that it assumes the position shown for keyframe 5, frame 65.

Though the figures do not convey the full extent of the animation sequence, it can be appreciated by imagining the character animated from FIG. 29 to FIG. 31 in a first animation sequence with the original keyframes. In this sequence the character goes from bending backwards on its right foot to standing on one foot with its arms slightly stretched to the sides. Assuming there are no multiple intervening footsteps, this would be a dance-like motion with the character first leaning back on one foot and then standing erect on the other foot. This motion occurs relatively quickly since the time between keyframe 4 and keyframe 5 is 20 frames or about ⅔ of a second, assuming a 30 fps playback frame rate. The frames generated "in between" these two keyframes would be similar to that of a human actor performing the movement.

In contrast, the animation sequence based on keyframes 4 and 5 of FIGS. 30 and 32, respectively, creates a much different animation. The animation sequence with the keyframes of FIGS. 30 and 32 begins with the figure bending forward while standing on its right foot, then standing erect on its left foot with its left arm off to the side and its right arm raised near his head. Again, the time to switch between these two keyframes is ⅔ of a second, however, it can be imagined that the movements from one position to another are vastly different than those in keyframes 4 and 5 of the animation sequence of FIGS. 29 and 31. The user is able to create this different animation sequence very easily merely by specifying and moving the spine in keyframe 4 and specifying and moving the arm in keyframe 5.

FIG. 33 is a flowchart showing the basic steps in animating a character using the animation system of the present invention.

At step 202 the user creates footsteps according to the discussion above. The user is also able to specify the skeletal structure forming the basic shape of the animal, creature or object to be animated. The user may also specify a gravity magnitude to be used in the animation system's calculations.

The user may then iteratively edit the footsteps, animal and gravity as shown by step 206. The user may also invoke the default footstep compiler at step 204. The default footstep compiler generates default keyframes which may be edited, deleted, repositioned within the timeline, etc., as discussed above. The editing of keyframes is represented as step 208 and may also be repeated, as needed, to achieve the desired animation.

In the event that the user alters the footsteps, animal structure, or gravity after modifying the default keyframes and the user wishes to preserve these keyframe modifications, the user may invoke the adaptive footstep compiler 210 instead of the default footstep compiler in 204. By using adaptive footstep compiler 210 the user can adapt the keyframes (including those idiosyncrasies introduced by the user during the editing process in 208) to match the altered set of footprints, animal structure or gravity.

Repeated execution of 212 and 214 for a sequence of frames produces an animation of that motion sequence. During the course of the design process, the user may wish to view selected frame sequences or even single frames. The sequence of postures of the animal's skeleton that is output as data from 214 may be used as input to other animation functions, such as muscle and skin deformations of animal's geometry and three dimensional image-synthesis rendering programs that employ photorealistic shading, texture mapping, motion blur, etc. However, to increase computational speed for rapid feedback during the initial design process, it is sufficient to display a simple wireframe representation of the character's kinematic links (as shown in the accompanying screen display examples), which may be animated in real time (30 frames per second) on today's advanced personal computers and low-end workstations.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A computer program product for generating a sequence of movements of a simulated character for use with a computer system having a display and a user input device, the simulated character being a representation of a real or imaginary creature comprising a plurality of simulated body parts attached at prespecified attachment points, the plurality of simulated body parts including one or more extremity, the computer program product comprising:

program code defining a process of displaying a view of a space on the display coupled to the computer system;

program code defining a process of accepting signals from the user input device coupled to the computer system, the signals specifying a location in the space and a time for each of a plurality of footsteps, a footstep being a placement of one of the one or more extremity in the space;

program code defining a process of displaying a footprint for each footstep indicating the location of the footstep in the space;

program code defining a process of determining a plurality of parameters for the entire sequence of movements; and program code defining a process of generating a series of keyframes wherein the series of keyframes collectively describe a sequence of movements of the simulated character along a coherent trajectory which sequence simultaneously satisfies the constraints of (1) having the one or more extremity coincide with the plurality of footsteps in space and time, and (2) the plurality of parameters on the plurality of simulated body parts, wherein at least one parameter of the plurality of parameters affects the content of a plurality of keyframes in the sequence of keyframes; and a computer-readable medium on which the program codes are stored.

2. A computer program product for generating a sequence of movements of a simulated character for use with a computer system having a coupled display and a coupled user input device, the simulated character being a representation of a real or imaginary creature comprising a plurality of simulated body parts attached at prespecified attachment points, the plurality of simulated body parts including one or more feet, the computer program product comprising:

program code defining a process of displaying a view of a space on the display;

program code defining a process of accepting signals from the user input device, the signals specifying a location in the space and a time for each of a plurality of footsteps;

program code defining a process of displaying a footprint for each footstep indicating the location of the footstep in the space;

program code defining a process of determining a plurality of parameters for the entire sequence of movements; and program code defining a process of generating a series of keyframes wherein the series of keyframes collectively describe a sequence of movements of the simulated character along a coherent trajectory which sequence simultaneously satisfies the constraints of (1) having the one or more feet coincide with the plurality of footsteps in space and time, and (2) the plurality of parameters on the plurality of simulated body parts, wherein at least one parameter of the plurality of parameters affects the content of a plurality of keyframes in the sequence of keyframes; and a computer-readable medium on which the program codes are stored.

3. The computer program product of claim 2, wherein the plurality of parameters is a plurality of physical parameters including a value for acceleration due to gravity and a center of gravity of the simulated character, the center of gravity being a function of the mass distributions attributed to each of the simulated body parts and their positions in the space, the program code defining the process of generating a series of keyframes further comprising program code defining a process of constraining movements of the simulated character to movements consistent with changes in the center of gravity.

4. The computer program product of claim 2, wherein the one or more feet comprise a left foot and a right foot and the program code defining the process of accepting further comprises:

program code defining a process of designating a foot, selected from the right foot and the left foot, to be associated with each footstep, the footsteps thus being right footsteps and left footsteps; and program code defining a process of displaying each footprint in the space with a visual indication of which foot is associated with said each footprint.

5. The computer program product of claim 4, wherein the program code defining the process of generating the series of keyframes program code defining a process of animating the simulated character such that the left foot coincides in space and time with the left footsteps and the right foot coincides in space and time with the right footsteps.

6. The computer program product of claim 4, wherein the program code defining the process of displaying each footprint is a comprises program code defining a process of displaying right footprints in one color and left footprints in a color other than the one color.

7. The computer program product of claim 4, wherein the program code defining the process of displaying a graph of the footsteps along a timeline further comprises program code defining a process of displaying a duration of a footstep indicating a time span within which a foot will coincide with a footprint.

8. The computer program product of claim 4, further comprising:
program code defining a process of displaying, on the display, a graph of the footsteps along a timeline, the graph indicating, for each footstep, a time that a foot of the simulated character will coincide with a footprint;
program code defining a process of accepting modification signals from the user input device specifying modifications to the graph, whereby modifications result in modified footsteps;
program code defining a process of displaying, on the display, footprints for each of the modified footsteps; and
program code defining a process of generating a series of modified keyframes wherein the series of modified keyframes collectively describe the sequence of movements of the simulated character which simultaneously satisfy the constraints of having the one or more feet coincide with the plurality of modified footsteps in space and time and the constraints of the parameters on the plurality of simulated body parts.

9. The computer program product of claim 2, wherein the program code defining the process of generating a series of keyframes further comprises:

program code defining a process of determining free fall durations, a free fall duration being a time span within which no feet are constrained to coincide with a footprint; and
program code defining a process of automatically animating the simulated character such that the simulated character's center of gravity travels through the space along a ballistic trajectory.

10. The computer program product of claim 9, wherein the program code defining the process of automatically animating comprises:
program code defining a process of generating at least one keyframe to simulate a jump start, where a velocity of the simulated character at the jump start is such that a ballistic flight trajectory results in the simulated character ending the jump at a jump end with at least one foot coinciding with at least one footstep;
program code defining a process of generating at least one keyframe to simulate the jump end, wherein the at least one foot coincides with the at least one footstep; and
program code defining a process of automatically adjusting the series of keyframes to include a deceleration of the simulated character consistent with a landing speed, a landing direction and a force of gravity.

11. The computer program product of claim 2, wherein the simulated body parts include legs, a spine, arms, hands and a head.

12. The computer program product of claim 2, wherein the sequence of movements satisfies the constraint of the plurality of simulated body parts remaining attached at the prespecified attachment points throughout the sequence of movements.

13. The computer program product of claim 2, wherein the simulated character is a simulated human.

14. The computer program product of claim 2, wherein the simulated character is a simulated nonhuman biped.

* * * * *